United States Patent
Zhang et al.

(10) Patent No.: US 11,828,667 B2
(45) Date of Patent: Nov. 28, 2023

(54) NON-INTRUSIVE DETECTION OF PIPE PARAMETERS USING SELECTED GUIDED ACOUSTIC WAVE MODES

(71) Applicant: ExxonMobil Technology and Engineering Company, Spring, TX (US)

(72) Inventors: Yibing Zhang, Annandale, NJ (US); Limin Song, West Windsor, NJ (US); Henry Alan Wolf, Morris Plains, NJ (US); Mark M. Disko, Glen Gardner, NJ (US); Brian C. Seabrook, Houston, TX (US)

(73) Assignee: ExxonMobil Technology and Engineering Company, Spring, TX (US)

( * ) Notice: Subject to any disclaimer, the term of this patent is extended or adjusted under 35 U.S.C. 154(b) by 281 days.

(21) Appl. No.: 17/370,450

(22) Filed: Jul. 8, 2021

(65) Prior Publication Data

US 2022/0034850 A1 Feb. 3, 2022

Related U.S. Application Data

(60) Provisional application No. 63/126,204, filed on Dec. 16, 2020, provisional application No. 63/058,613, filed on Jul. 30, 2020.

(51) Int. Cl.
*G01L 9/00* (2006.01)
*G01F 1/667* (2022.01)
(Continued)

(52) U.S. Cl.
CPC ............... *G01L 9/001* (2013.01); *G01F 1/66* (2013.01); *G01F 1/667* (2013.01); *G01F 1/74* (2013.01);
(Continued)

(58) Field of Classification Search
CPC . G01L 9/001; G01L 11/06; G01F 1/66; G01F 1/667; G01F 1/74; G01F 23/296;
(Continued)

(56) References Cited

U.S. PATENT DOCUMENTS 6,575,043 B1 6/2003 Huang et al.
9,297,678 B2 3/2016 Heinks et al.
(Continued)

FOREIGN PATENT DOCUMENTS

| CN | 106500800 A | | 3/2017 |
|---|---|---|---|
| JP | 2004003996 A | * | 1/2004 |
| JP | 2004347549 A | * | 12/2004 |

*Primary Examiner* — Tarun Sinha
(74) *Attorney, Agent, or Firm* — ExxonMobil Technology and Engineering Company—Law Department

(57) ABSTRACT

Methods and systems for measuring pipe parameters using guided acoustic wave modes are provided. The method includes receiving data corresponding to an acoustic signal, wherein the data are obtained by transmitting an excitation pulse at a specified frequency and detecting the resulting acoustic signal using an acoustic transducer attached to the outer surface of the pipe wall. The method includes analyzing the data to identify guided acoustic wave modes including at least two of: a C-SH acoustic wave mode that travels within the pipe wall; a C-LT acoustic wave mode that travels within the near-surface region of the pipe wall; and/or a CA acoustic wave mode that travels within the pipe cavity. The method includes calibrating the parameter measurement using the C-SH acoustic wave mode and determining the parameter measurement based on the phase velocity and/or the amplitude of the C-LT acoustic wave mode and/or the CA acoustic wave mode.

17 Claims, 19 Drawing Sheets

(51) Int. Cl.
- *G01F 1/74* (2006.01)
- *G01F 23/296* (2022.01)
- *G01N 29/02* (2006.01)
- *G01N 29/22* (2006.01)
- *G01F 1/66* (2022.01)

(52) U.S. Cl.
CPC ........... *G01F 23/296* (2013.01); *G01N 29/02* (2013.01); *G01N 29/222* (2013.01); *G01N 2291/024* (2013.01); *G01N 2291/02836* (2013.01); *G01N 2291/2634* (2013.01)

(58) Field of Classification Search
CPC ..... G01F 15/02; G01F 23/2968; G01N 29/02; G01N 29/222; G01N 2291/024; G01N 2291/02836; G01N 2291/2634
See application file for complete search history.

(56) References Cited

U.S. PATENT DOCUMENTS

| | | |
|---|---|---|
| 10,557,731 B2 | 2/2020 | Kippersund et al. |
| 2008/0163692 A1 | 7/2008 | Huang et al. |
| 2009/0025487 A1 | 1/2009 | Gysling et al. |
| 2020/0209028 A1 | 7/2020 | Matsui et al. |

\* cited by examiner

| Sensing Applications | C-SH Acoustic Wave Mode (Mode 1) | C-LT Acoustic Wave Mode (Mode 2) | CA Acoustic Wave Mode (Mode 3) |
|---|---|---|---|
| | Sensitive to Pressure | Sensitive to the Near-Surface Region of the Pipe | Sensitive to Media Inside Pipe Cavity |
| Multiphase Flow Detection | No | Yes | Yes |
| Liquid Level Detection | No | Yes | Yes |
| Wax Deposition Detection in Air-Filled or Water-Filled Pipe | No | Yes | Yes |
| Sand Level Detection in Water-Filled Pipe | No | Yes | Yes |

600
FIG. 6

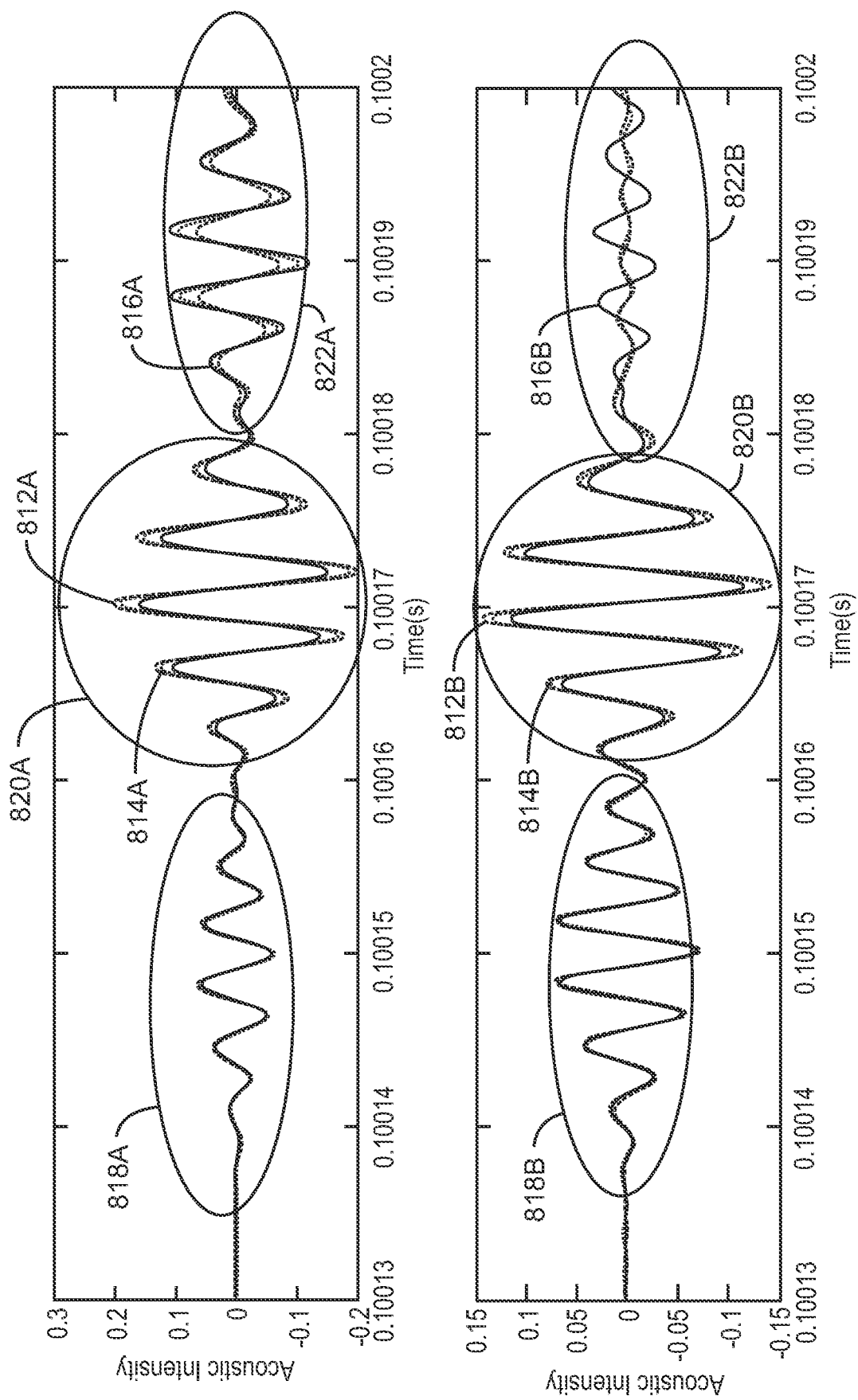

NON-INTRUSIVE DETECTION OF PIPE PARAMETERS USING SELECTED GUIDED ACOUSTIC WAVE MODES

CROSS REFERENCE TO RELATED APPLICATIONS

This application claims the benefit of U.S. Provisional Application No. 63/126,204, filed Dec. 16, 2020, and U.S. Provisional Application No. 63/058,613, filed Jul. 30, 2020, the disclosures of which are herein incorporated by reference in their entireties.

FIELD OF THE INVENTION

The techniques described herein relate to sensing applications for pipe and vessels. More particularly, the techniques described herein relate to the non-intrusive detection of various parameters relating to pipes and vessels using selected guided acoustic wave modes.

BACKGROUND OF THE INVENTION

This section is intended to introduce various aspects of the art, which may be associated with embodiments of the present techniques. This discussion is believed to assist in providing a framework to facilitate a better understanding of particular aspects of the present techniques. Accordingly, it should be understood that this section should be read in this light, and not necessarily as admissions of prior art.

Acoustic (or ultrasonic) clamp-on technologies are used for a wide range of sensing applications, such as Doppler flow measurement and point liquid level detection. In operation, such technologies involve generating acoustic signals that interact with liquids inside a pipe (or vessel), and then detecting the resulting acoustic waves propagating through the pipe. The detected acoustic waves are then analyzed to determine specific conditions or parameters relating to the pipe. However, such technologies are generally intrusive, meaning that they rely on the direct interaction of the acoustic waves with the liquid within the pipe, such as, for example, in the form of acoustic wave propagation within the liquid or reflection of the acoustic waves at liquid/pipe, liquid/liquid, and/or liquid/gas boundary points. Moreover, intrusive acoustic technologies have many known drawbacks, such as introducing the potential for leakage from the pipe, creating holes, openings, and/or material interfaces that could accelerate corrosion or erosion, and inducing temperature gradients that may cause fouling and encourage the formation of hydrates.

An example of existing acoustic clamp-on technology is provided by U.S. Pat. No. 10,557,731 B2 to Kippersund et al., entitled "Sensor Apparatus and Method for Measuring Flow". According to the conceptual method described therein, helical acoustic waves are generated within the wall of a conduit. The generated helical acoustic waves propagate over an extensive area of the wall of the conduit, leaking acoustical energy that stimulates the generation of chordal paths of acoustic waves within the flow. The acoustic waves within the flow then re-enter the wall of the conduit and propagate further as guided helical acoustic waves. The guided helical acoustic waves are then measured and used to identify characterizing properties relating to the flow within the conduit. However, this conceptual method relies on a specialized transducer configuration including multiple transducers arranged as an elongated waveguide that supports the propagation of the helical acoustic waves from one or more driver elements disposed at one or more ends of the elongated waveguide. Furthermore, this method covers a large range of high frequencies, e.g., around 100 hertz (Hz) to 1 megahertz (MHz). Therefore, the resulting helical acoustic waves suffer from high attenuation and reduced sensitivity.

Another example of existing acoustic technology involves using the speed and attenuation of ultrasound to measure bubble, droplet, and particle-size distributions in multiphase systems. This technique utilizes acoustic tone-burst signals with a large frequency range (i.e., typically 100 kilohertz (kHz)-100 MHz). The resulting acoustic waves are used to infer the volume fraction of gas in water within the multiphase system based on the dispersion curve of the bubbly liquid. This technique is effective as long as the acoustic frequency is comparatively higher than the air bubble resonance frequencies. However, because this technique uses a large range of high frequencies, the resulting acoustic waves suffer from high attenuation and reduced sensitivity. Moreover, because this technique utilizes acoustic transducers that are immersed inside the multiphase system, it is intrusive.

Another example of existing acoustic clamp-on technology involves using guided acoustic wave modes to detect fouling build-up in lengthy pipes. According to this technique, acoustic signals are generated using transmitter-and-receiver arrays, where the frequency, number of cycles, and dispersion of the acoustic signals are carefully selected. Fouling inside a section of the pipe along its axial direction is monitored using a pitch-catch mode, where the average fouling thickness in the pipe section is quantified by the reduction in the signal amplitude. However, this amplitude-based measurement technique suffers from the gradual degradation of the acoustic coupling between the pipe and the transmitter-and-receiver arrays, especially in the case of long-term deployment.

Another example of existing acoustic clamp-on technology involves monitoring soft deposition layers in liquid-filled tubes by generating and detecting two guided acoustic wave modes using an acoustic clamp-on device. This technique is based on the different impact of the deposition layers on the propagation of the circumferential guided acoustic wave mode in the pipe wall versus the guided acoustic wave mode in the liquid inside the pipe. However, because the two guided acoustic wave modes are affected by temperature, pressure, deposition layer thickness, and material properties, the temperature compensation capability is limited according to this technique. Moreover, this technique is not applicable to a gas-filled pipe because it is dependent on the guided acoustic wave mode propagating through the liquid inside the pipe. In addition, this technique is not feasible when the inner wall of the pipe includes a partial (or full) deposition layer along its circumference.

For these existing acoustic clamp-on technologies, the frequencies of the generated acoustic signals are generally above 1 MHz. However, such high-frequency acoustic signals suffer from high attenuation within the corresponding pipe, thus limiting the acoustic propagation length and, ultimately, reducing the sensitivity of the resulting measurements.

Furthermore, most existing acoustic clamp-on technologies treat the detected acoustic waves as bulk waves rather than guided waves. Unlike a bulk wave, a guided acoustic wave is generated at a frequency band at which the acoustic wavelength is comparable to the size and dimensions of the acoustic medium, such as, for example, the wall thickness and diameter of the pipe. Depending on the frequency of the acoustic excitation pulse, various guided acoustic wave modes may co-exist in the structure. Each guided acoustic wave mode has its own phase velocities, group velocities, and attenuation properties. As these guided acoustic wave modes interact with the surrounding media differently, one or more selected modes may be used for sensing different physical parameters of the surrounding media. However, one challenge of using individual guided acoustic wave modes is to selectively generate and detect such modes. In particular, it is difficult to separate such modes at the receiver due to mode dispersion and convergence in the pipe or vessel.

Known mode separation techniques rely on complex signal processing methods, such as time-frequency reconstruction and 2D Fourier transform methods. Such complex signal processing methods, in turn, rely on the collection of acoustic data through multiple transducers (or multiple scanning processes of a single transducer), thus increasing the overall complexity of the transducer hardware design and installation. Accordingly, there is a need for improved techniques for generating and detecting well-separated guided acoustic wave modes for reliable sensing applications.

SUMMARY OF THE INVENTION

An embodiment described herein provides a method for measuring a parameter relating to a pipe using guided acoustic wave modes. The method includes receiving, at a computing system, data corresponding to an acoustic signal; wherein the data are obtained by transmitting an excitation pulse at a specified frequency and detecting the resulting acoustic signal using at least one acoustic transducer attached to an outer surface of a wall of a pipe; and wherein the specified frequency is within a range of 10 kilohertz (kHz) to 2 megahertz (MHz). The method also includes analyzing, via the computing system, the data to identify guided acoustic wave modes within the acoustic signal; wherein the guided acoustic wave modes include at least two of: a circumferential shear horizontal (C-SH) acoustic wave mode that travels within the wall of the pipe; a circumferential Lamb type (C-LT) acoustic wave mode that travels within a near-surface region of the wall of the pipe; or a cavity (CA) acoustic wave mode that travels within a cavity of the pipe. The method further includes determining, via the computing system, a measurement for at least one parameter relating to the pipe based on the identified guided acoustic wave modes; wherein the at least one parameter includes a multiphase flow condition, a liquid level, a volume fraction of water, oil, and/or gas, an amount of solids deposition, an identification of solids, and/or a flow rate within the pipe; and wherein determining the measurement includes calibrating the measurement using the C-SH acoustic wave mode and determining the measurement based on a phase velocity and/or an amplitude of the C-LT acoustic wave mode, the CA acoustic wave mode, or a combination thereof.

Another embodiment described herein provides a system, including an acoustic transducer attached to an outer surface of a wall of a pipe in a direction that is perpendicular to a flow within the pipe. The acoustic transducer is configured for a pulse-echo mode operation in which the acoustic transducer transmits an excitation pulse at a specified frequency that is within a range of 10 kHz) to 2 MHz and detects the resulting acoustic signal. The acoustic signal includes guided acoustic wave modes that include at least two of: a C-SH acoustic wave mode that travels within the wall of the pipe; a C-LT acoustic wave mode that travels within a near-surface region of the wall of the pipe; and a CA acoustic wave mode that travels within a cavity of the pipe. Moreover, properties of the C-LT acoustic wave mode and/or the CA acoustic wave mode are directly correlated to a multiphase flow condition, a liquid level, a volume fraction of water, oil, and/or gas, an amount of solids deposition, an identification of solids, and/or a flow rate within the pipe. In contrast, properties of the C-SH acoustic wave mode are directly correlated to a pressure within the pipe but are substantially immune to the multiphase flow condition, the liquid level, the volume fraction of water, oil, and/or gas, the amount of solids deposition, the identification of solids, and the flow rate within the pipe.

Another embodiment described herein provides a system, including a first acoustic transducer attached to an outer surface of a wall of a pipe in a direction that is perpendicular to a flow within the pipe, and a second acoustic transducer attached to the outer surface of the wall of the pipe opposite to the first acoustic transducer and in the direction that is perpendicular to the flow within the pipe. The first acoustic transducer and the second acoustic transducer are configured for a pitch-catch mode operation in which the first acoustic transducer transmits an excitation pulse at a specified frequency that is within a range of 10 kHz to 2 MHz, and the second acoustic transducer detects the resulting acoustic signal. The acoustic signal includes guided acoustic wave modes that include at least two of: a C-SH acoustic wave mode that travels within the wall of the pipe; a C-LT acoustic wave mode that travels within a near-surface region of the wall of the pipe; and a CA acoustic wave mode that travels within a cavity of the pipe. Moreover, properties of the C-LT acoustic wave mode and/or the CA acoustic wave mode are directly correlated to a multiphase flow condition, a liquid level, a volume fraction of water, oil, and/or gas, an amount of solids deposition, an identification of solids, and/or a flow rate within the pipe. In contrast, properties of the C-SH acoustic wave mode are directly correlated to a pressure within the pipe but are substantially immune to the multiphase flow condition, the liquid level, the volume fraction of water, oil, and/or gas, the amount of solids deposition, the identification of solids, and the flow rate within the pipe.

DESCRIPTION OF THE DRAWINGS

Advantages of the present techniques may become apparent upon reviewing the following detailed description and drawings of non-limiting examples.

FIG. 6 is a table showing the utility of each guided acoustic wave mode described herein (i.e., Mode 1, Mode 2, and Mode 3) for detecting specific parameters relating to pipes/vessels.

FIG. 8D includes two graphs showing a more detailed view of acoustic signals corresponding to all three acoustic wave modes that were generated and detected using the first pair of piezoelectric transducers and the second pair of piezoelectric transducers, respectively, according to the experimental setup of FIGS. 8A and 8B.

Figure 1:
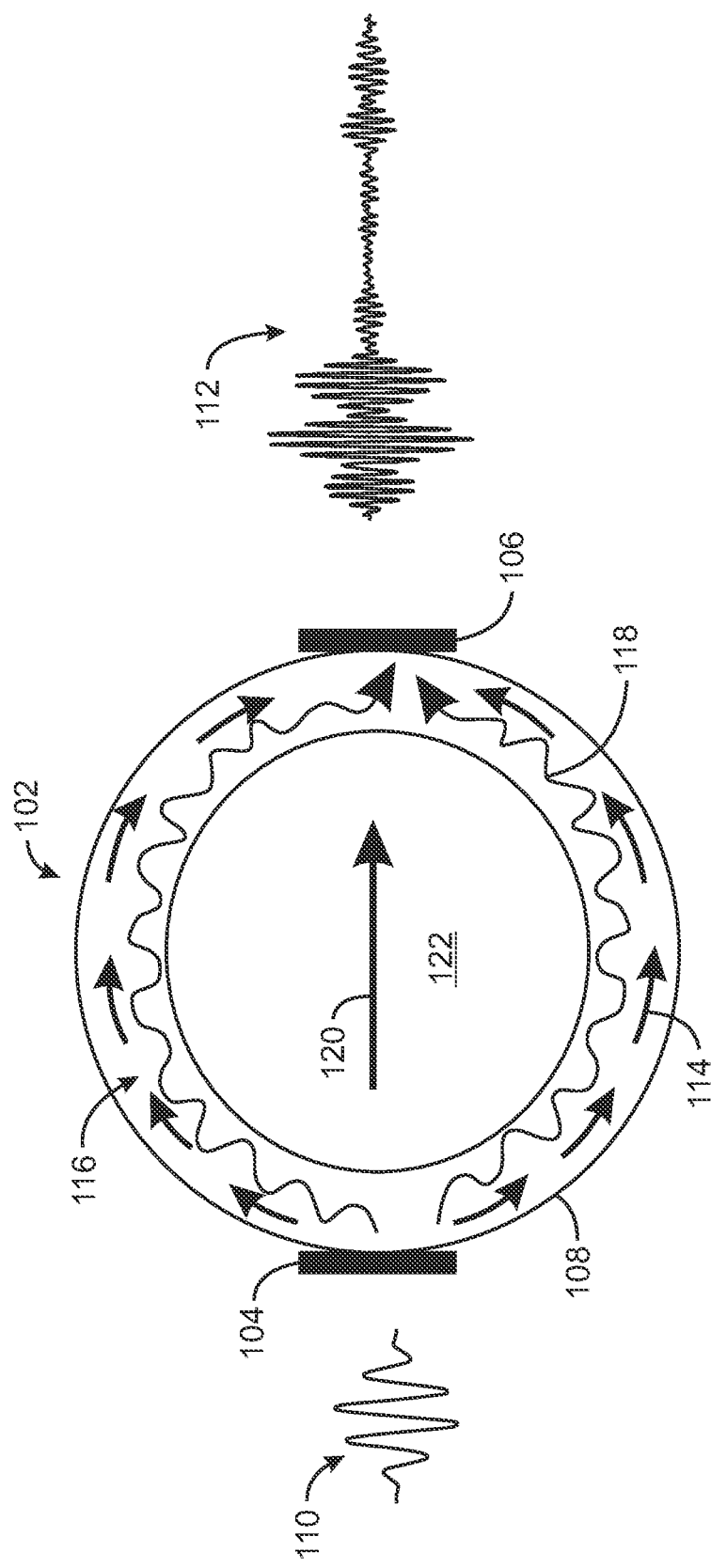
FIG. 1 is a schematic view of an exemplary system for generating and detecting guided acoustic wave modes according to embodiments described herein.

It should be noted that the figures are merely examples of the present techniques and are not intended to impose limitations on the scope of the present techniques. Further, the figures are generally not drawn to scale, but are drafted for purposes of convenience and clarity in illustrating various aspects of the techniques.

DETAILED DESCRIPTION OF THE INVENTION

In the following detailed description section, the specific examples of the present techniques are described in connection with preferred embodiments. However, to the extent that the following description is specific to a particular embodiment or a particular use of the present techniques, this is intended to be for example purposes only and simply provides a description of the embodiments. Accordingly, the techniques are not limited to the specific embodiments described below, but rather, include all alternatives, modifications, and equivalents falling within the true spirit and scope of the appended claims.

At the outset, and for ease of reference, certain terms used in this application and their meanings as used in this context are set forth. To the extent a term used herein is not defined below, it should be given the broadest definition persons in the pertinent art have given that term as reflected in at least one printed publication or issued patent. Further, the present techniques are not limited by the usage of the terms shown below, as all equivalents, synonyms, new developments, and terms or techniques that serve the same or a similar purpose are considered to be within the scope of the present claims.

As used herein, the terms "a" and "an" mean one or more when applied to any embodiment described herein. The use of "a" and "an" does not limit the meaning to a single feature unless such a limit is specifically stated.

As used herein, the term "acoustic wave" refers to a sound wave. Moreover, the term "acoustic wave" encompasses "ultrasonic waves," which are sound waves with a frequency greater than the upper limit of human hearing, which is generally over 20 kHz. Like other types of waves, acoustic waves can be differentiated by their frequency, amplitude, wavelength, phase velocity, and group velocity. The wavelength of a particular wave is defined as the wave's phase velocity divided by its frequency, where wavelength is measured in meters (m), phase velocity is measured in meters per second (m/s), and frequency is measured in Hertz (Hz). Moreover, the amplitude of a particular wave is the wave's maximum displacement from its rest position. When a wave is represented graphically, the wavelength may be identified by determining the distance between the successive peaks of the wave, and the amplitude may be identified by determining the distance between the wave's center line and its peak. Furthermore, waves are often described in terms of wave modes, where the term "wave mode" refers to a particular form of a wave as it propagates through a medium.

In addition, the "phase velocity" of a wave is calculated based on the phase of a waveform, while the "group velocity" of the wave is calculated based on the envelope of the entire waveform and is related to the energy the waveform carries. Both the phase velocity and the group velocity are measured in meters per second (m/s). Moreover, both phase-velocity-based signal processing methods and group-velocity-based signal processing methods can be used to analyze guided acoustic wave modes. Due to the relatively narrow frequency band selected to generate the guided acoustic wave modes according to embodiments described herein, the dispersion in the acoustic wave is minimized, and the group and phase velocities of the acoustic wave are equal.

Therefore, the terms "phase velocity" and "group velocity" can be used interchangeably according to embodiments described herein.

The term "and/or" placed between a first entity and a second entity means one of (1) the first entity, (2) the second entity, and (3) the first entity and the second entity. Multiple entities listed with "and/or" should be construed in the same manner, i.e., "one or more" of the entities so conjoined. Other entities may optionally be present other than the entities specifically identified by the "and/or" clause, whether related or unrelated to those entities specifically identified. Thus, as a non-limiting example, a reference to "A and/or B," when used in conjunction with open-ended language such as "including," may refer, in one embodiment, to A only (optionally including entities other than B); in another embodiment, to B only (optionally including entities other than A); in yet another embodiment, to both A and B (optionally including other entities). These entities may refer to elements, actions, structures, steps, operations, values, and the like.

The phrase "at least one," in reference to a list of one or more entities, should be understood to mean at least one entity selected from any one or more of the entities in the list of entities, but not necessarily including at least one of each and every entity specifically listed within the list of entities, and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently, "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

As used herein, the term "configured" means that the element, component, or other subject matter is designed and/or intended to perform a given function. Thus, the use of the term "configured" should not be construed to mean that a given element, component, or other subject matter is simply "capable of" performing a given function but that the element, component, and/or other subject matter is specifically selected, created, implemented, utilized, and/or designed for the purpose of performing the function.

As used herein, the terms "example," exemplary," and "embodiment," when used with reference to one or more components, features, structures, or methods according to the present techniques, are intended to convey that the described component, feature, structure, or method is an illustrative, non-exclusive example of components, features, structures, or methods according to the present techniques. Thus, the described component, feature, structure or method is not intended to be limiting, required, or exclusive/exhaustive; and other components, features, structures, or methods, including structurally and/or functionally similar and/or equivalent components, features, structures, or methods, are also within the scope of the present techniques.

As used herein, the term "fluid" refers to gases, liquids, and combinations of gases and liquids, as well as to combinations of gases and solids, and combinations of liquids and solids. Relatedly, as used herein, the term "multiphase" refers to a fluid including two or more phases, i.e., combinations of gases, liquids, and/or solids.

The term "non-intrusive" is used in relation to the guided acoustic wave modes described herein to indicate that such guided acoustic wave modes are generated by transducer(s) (or other device(s)) that have no direct contact with (or exposure to) the fluid media within the pipe/vessel to which they are attached, as well as no expensive, failure-prone windows (such as, for example, sapphire windows) between the transducer(s) and the pipe/vessel.

As used herein, the term "pipe" refers to a fluid conduit having an axial bore. A pipe can have any cross-sectional shape, such as circular, square, rectangular, and the like. For the purposes of this disclosure, the term "pipe" also includes other tubular structures, which in the oil and gas industry include drill pipe, drill collars, tubing, casing, liner, bottom hole assemblies, and the like. Other industries may employ various types of tubular structures, and these are also included within the definition of "pipe" herein. Furthermore, as used herein, the term "vessel" refers to any structure that is designed to store or transport a fluid, and that includes at least one wall preventing motion of a fluid in at least one direction. It should be noted that, while embodiments are sometimes described herein as relating to pipes, this is for ease of discussion only, as embodiments described herein may be similarly applied to any suitable type of vessel or other structure acting as a fluid conduit.

The term "pressure" refers to a force acting on a unit area. A pressure value is typically expressed as a number of pounds per square inch (psi).

As used herein, the term "transducer" refers to any suitable type of device that is configured to transmit an acoustic excitation pulse within a medium and then receive a resulting acoustic wave propagating through the medium. Examples of transducers that may be used according to embodiments described herein include magnetostrictive transducers, piezoelectric transducers, electromagnetic acoustic transducers, and the like. Moreover, the term "transducer" may also be used to refer to any suitable type of device that is configured as a transmitter only, as well as to any suitable type of device that is configured as a receiver only, depending on the details of the specific implementation.

Certain aspects and features are described herein using a set of numerical upper limits and a set of numerical lower limits. It should be appreciated that ranges from any lower limit to any upper limit are contemplated unless otherwise indicated. All numerical values are "about" or "approximately" the indicated value, and account for experimental errors and variations that would be expected by a person having ordinary skill in the art.

Embodiments described herein provide cost-effective, non-intrusive techniques for measuring or detecting various parameters relating to pipes and vessels using guided acoustic wave modes. More specifically, according to embodiments described herein, guided acoustic wave modes are selectively generated and detected in/around a pipe. Examples of guided acoustic wave modes that are suitable for techniques described herein include circumferential acoustic wave modes, which travel along the circumference the pipe, and cavity acoustic wave modes, which travel through the water within the pipe in a direction perpendicular to flow, i.e., across the pipe cross section. More specifically, in various embodiments, three guided acoustic wave modes are generated with relation to the pipe: (1) a circumferential shear horizontal (C-SH) acoustic wave mode within the wall of the pipe (referred to herein as "Mode 1"); (2) a circumferential Lamb type (C-LT) acoustic wave mode within the wall of the pipe (referred to herein as "Mode 2"); and a cavity (CA) acoustic wave mode that travels through the fluid in the interior of the pipe (referred to herein as "Mode 3"). Furthermore, according to embodiments described herein, the selected guided acoustic wave modes are generated in an operating frequency range of approximately 50 kHz to 1 MHz, or approximately 10 kHz to 2 Mhz, for example.

In various embodiments, the guided acoustic wave modes are selectively generated, propagated, and detected using one or more simple acoustic transducers. For example, paired transducers may be used for pitch-catch (or transmit-receive) operations, in which a first transducer transmits the guided acoustic wave modes and a second transducer receives the guided acoustic wave modes. Alternatively, a single transducer may be used for pulse-echo operations, in which the transducer both transmits and receives the guided acoustic wave modes. Moreover, in some embodiments, multiple transducers (or transducer pairs) are deployed along the length of a pipe/vessel to allow for distributed measurements.

Such guided acoustic wave modes may be used to measure or detect various parameters relating to pipes/vessels in a wide range of surface and subsurface applications, such as surface hydrocarbon processing applications and downhole hydrocarbon well applications. For example, the non-intrusive parameter detection techniques described herein may be used to measure or detect liquid level, solids (e.g., wax/scale and/or sand) deposition and composition, multiphase (e.g., liquid/gas) flow conditions, water/oil/gas volume fractions, flow rate, and pressure conditions relating to particular pipes and/or vessels. This may be accomplished by exploiting the sensitivity differences of the guided acoustic wave modes (e.g., Mode 1, Mode 2, and/or Mode 3) to the surrounding media. Specifically, as a result of such sensitivity differences, different parameters relating to the pipe can be measured by selectively generating, propagating, and detecting specific individual or combined guided acoustic wave modes. In some embodiments, this involves separating and/or combining two or more guided acoustic wave modes to determine various parameters relating to the surrounding media.

Furthermore, according to embodiments described herein, the one or more acoustic transducers are configured to measure or detect the pipe parameters by monitoring a two-dimensional cross section of the pipe. This may be accomplished by using a single acoustic transducer, or by pairing and separating two acoustic transducers at a certain distance to allow for separation of the guided acoustic wave modes. Moreover, by monitoring the two-dimensional pipe cross section, the acoustic transducer(s) can be used to generate two-dimensional tomographic images of the pipe cross section, thus providing highly detailed information relating to the pipe parameters at that location along the pipe.

Exemplary System for Non-Intrusively Detecting Parameters Relating to Pipes/Vessels Using Guided Acoustic Wave Modes FIG. 1 is a schematic view of an exemplary system 100 for generating and detecting guided acoustic wave modes according to embodiments described herein. Specifically, the schematic view of FIG. 1 shows a cross section of a pipe 102. A first acoustic transducer 104 and a second acoustic transducer 106 are clamped or otherwise attached to an outer surface or circumference 108 of the pipe 102. The first acoustic transducer 104 is configured to transmit an excitation pulse 110 at a specific frequency using an envelope modified waveform, and the second acoustic transducer 106 is configured to receive the resulting acoustic signal 112 transmitted by the first acoustic transducer 104. As shown schematically in FIG. 1, the excitation pulse 110 is a Hanning windowed 5-cycle sinusoidal waveform, although other types of excitation pulses may be used. The transmitted signal 112 travels between the first and second acoustic transducers 104 and 106 in three different guided acoustic wave modes: (1) a C-SH acoustic wave mode 114 (i.e. Mode 1) within a wall 116 of the pipe 102, a C-LT acoustic wave mode 118 (i.e. Mode 2) within the wall 116 of the pipe 102, and a CA acoustic wave mode 120 (i.e., Mode 3) that travels through the fluid within the cavity 122 (i.e., the interior) of the pipe 102. The received signal 112 as a function of time is shown in FIG. 1, as well as in more detail in FIG. 2.

The schematic view of FIG. 1 is not intended to indicate that the system 100 is to include all of the components shown in FIG. 1, or that the system 100 is limited to only the components shown in FIG. 1. Rather, any number of components may be omitted from the system 100 or added to the system 100, depending on the details of the specific implementation. For example, while the embodiment shown in FIG. 1 represents a pitch-catch (or transmit-receive) mode operation including two acoustic transducers 104 and 106, it will be appreciated by one of skill in the art that the system 100 may alternatively be arranged for pulse-echo mode operation using a single acoustic transducer. Moreover, in some cases, the system 100 may be arranged as a distributed system including multiple acoustic transducer pairs (or single transducers) spaced out along a length of the pipe. Furthermore, while embodiments are primarily described herein as relating to pipes, this is for ease of discussion only, as embodiments described herein may be similarly applied to any suitable type of vessel or other structure acting as a fluid conduit.

In some embodiments, the system 100 also includes a separate temperature sensor, such as a thermocouple or resistance temperature detector (RTD) that is configured to measure the temperature within the pipe. The temperature measurements may then be used as a compensation mechanism for determining the other parameter measurements, or may be used to augment the other parameter measurements with additional information. For example, in some embodiments, such temperature measurements are useful (in combination with one or more other parameter measurements) for determining when negative conditions are likely to form within the pipe. Such negative conditions may include, for example, the formation of asphaltenes or hydrates or the deposition of wax/scale and/or sand within the pipe.

Figure 2:
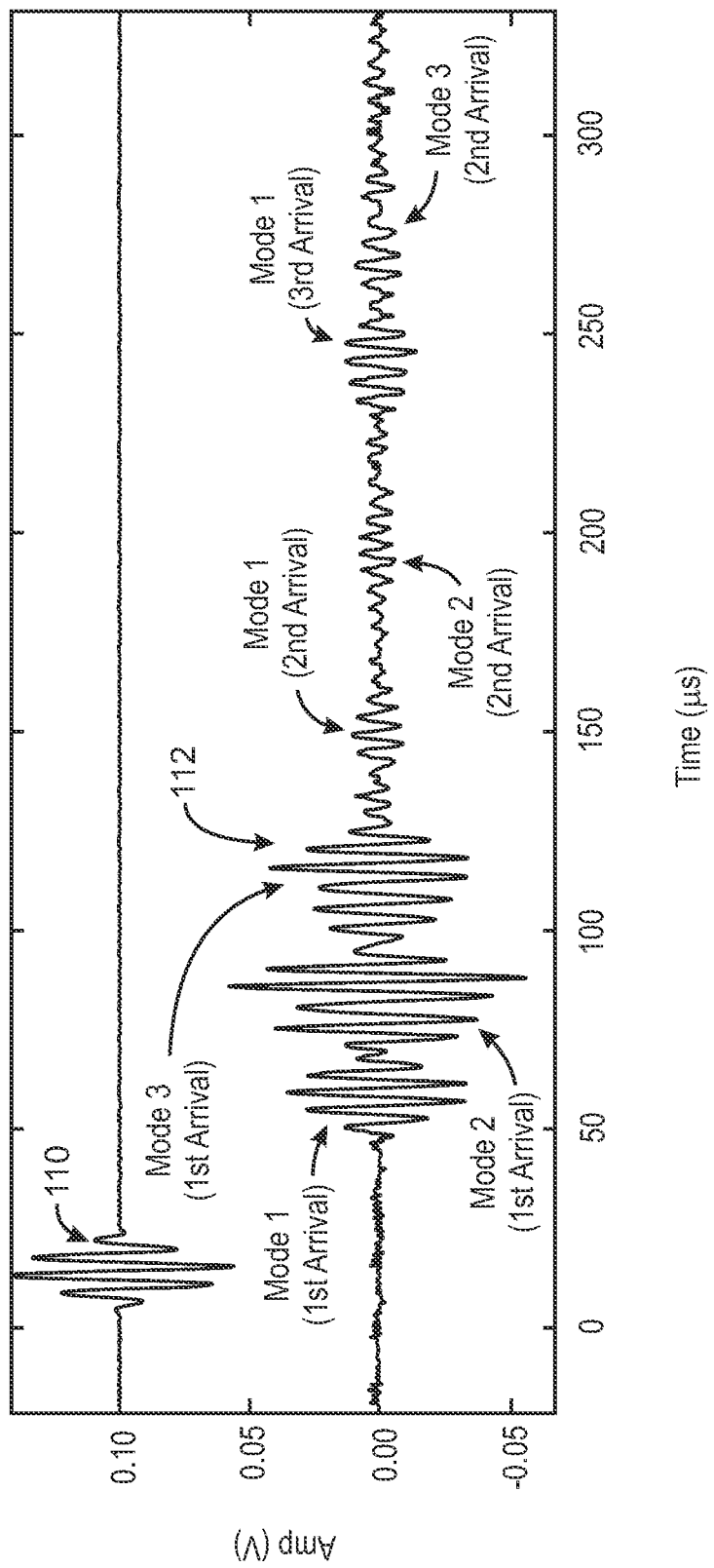
FIG. 2 is a graph showing the amplitudes as a function of time for the excitation pulse and the resulting acoustic signal described with respect to FIG. 1.

FIG. 2 is a graph showing the amplitudes as a function of time for the excitation pulse 110 and the resulting acoustic signal 112 described with respect to FIG. 1. Like numbered items are as described with respect to FIG. 1. In particular, FIG. 2 shows how the acoustic signal 112 is transmitted via the three guided acoustic wave modes, i.e., the C-SH acoustic wave mode 114 (Mode 1), the C-LT acoustic wave mode 118 (Mode 2), and the CA acoustic wave mode 120 (Mode 3). Since the acoustic path for the acoustic signal 112 includes circulating the circumference 108 of the pipe 102 (i.e., Mode 1 and Mode 2) or bouncing back-and-forth in the cavity 122 of the pipe 102 (i.e., Mode 3), these three guided acoustic wave modes 114, 118, and 120 will continue looping around the pipe 102 or bouncing in the cavity 122 until they are attenuated. The first arrival of the excitation signal 110 at the second acoustic transducer 106 is the C-SH acoustic wave mode 114 (Mode 1); the second arrival is the C-LT acoustic wave mode 118 (Mode 2); and the third arrival is the CA acoustic wave mode 120 (Mode 3). However, the second arrival of the CA acoustic wave mode 120 (Mode 3) is later in time than the third arrival of the C-SH acoustic wave mode 114 (Mode 1). This is due to the fact that, although all three guided acoustic wave modes 114, 118, and 120 are generated simultaneously by the first acoustic transducer 104, the time of arrival of each mode 114, 118, and 120 at the second acoustic transducer 106 depends on the relationship between the time duration of the excitation pulse 110 and the propagation time of each mode 114, 118, and 120, which is a function of the phase velocity of each mode 114, 118, and 120 and the length of the propagation path. Therefore, to separate the contribution of each mode 114, 118, and 120 in the received acoustic signal 112, the frequency of the excitation pulse 110 is selected based on specific properties relating to the pipe 102, such as the pipe diameter, the pipe wall thickness, and the pipe-material-related sound speed.

Figure 3A:
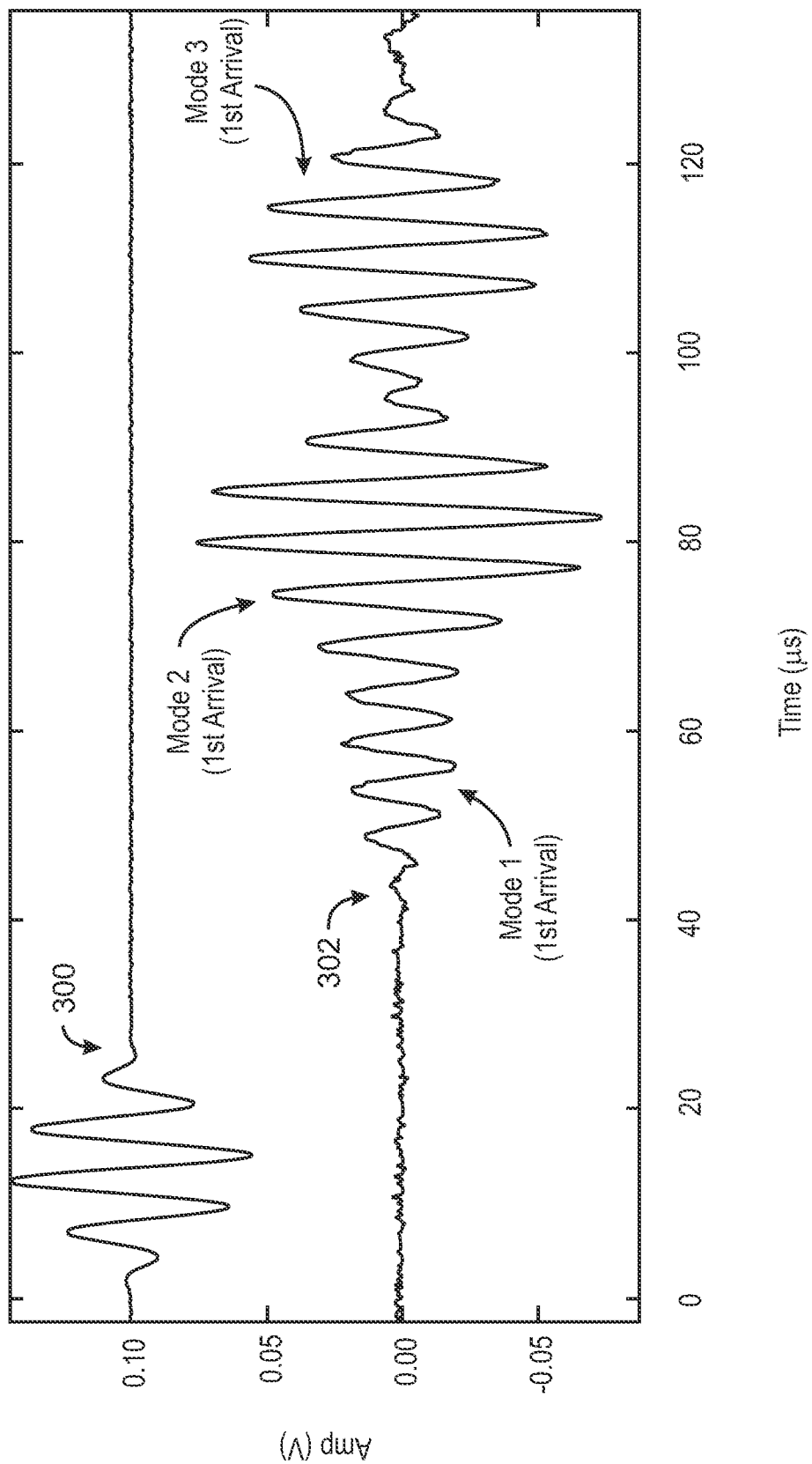
FIG. 3A is a graph showing the amplitude as a function of time for an excitation pulse generated at a frequency of 180 kHz, as well the amplitude as a function of time for the resulting acoustic signal.
Figure 3B:
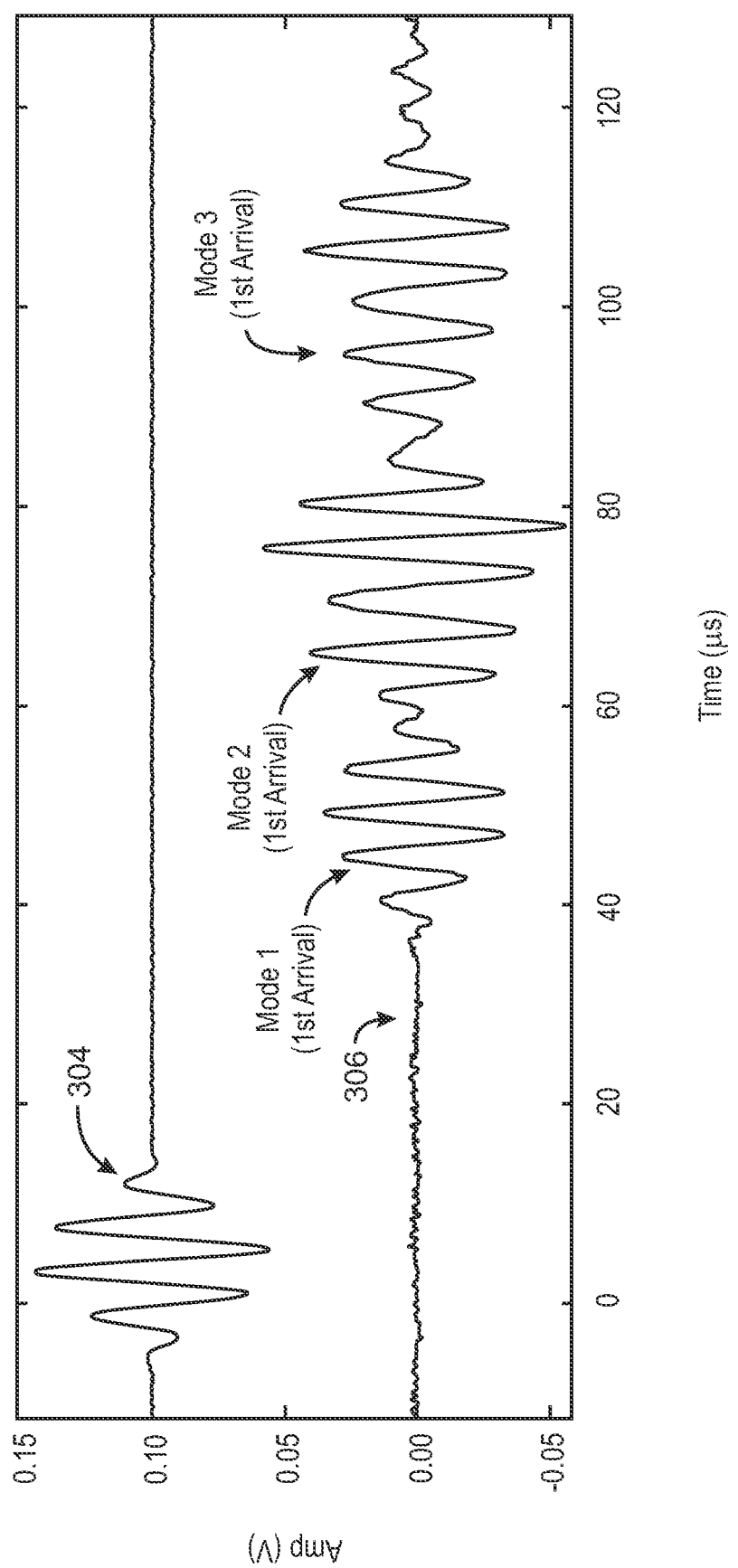
FIG. 3B is a graph showing the amplitude as a function of time for an excitation pulse generated at a frequency of 220 kHz, as well the amplitude as a function of time for the resulting acoustic signal.

FIGS. 3A and 3B show the effects of selecting two different frequencies for generating the excitation pulse. Specifically, FIG. 3A is a graph showing the amplitude as a function of time for an excitation pulse 300 generated at a frequency of 180 kHz, as well the amplitude as a function of time for the resulting acoustic signal 302. Similarly, FIG. 3B is a graph showing the amplitude as a function of time for an excitation pulse 304 generated at a frequency of 220 kHz, as well the amplitude as a function of time for the resulting acoustic signal 306. Both excitation pulses 300 and 304 were generated within a 5.5-inch (in.) (or 14-centimeter (cm)) casing as Hanning windowed 5-cycle sinusoidal pulses. As shown in FIG. 3A, at a frequency of 180 kHz, Mode 2 and Mode 3 are clearly separated in time, while Mode 1 and Mode 2 are not. On the other hand, as shown in FIG. 3B, all three modes are clearly separated in time at a frequency of 220 kHz.

Figure 4A:
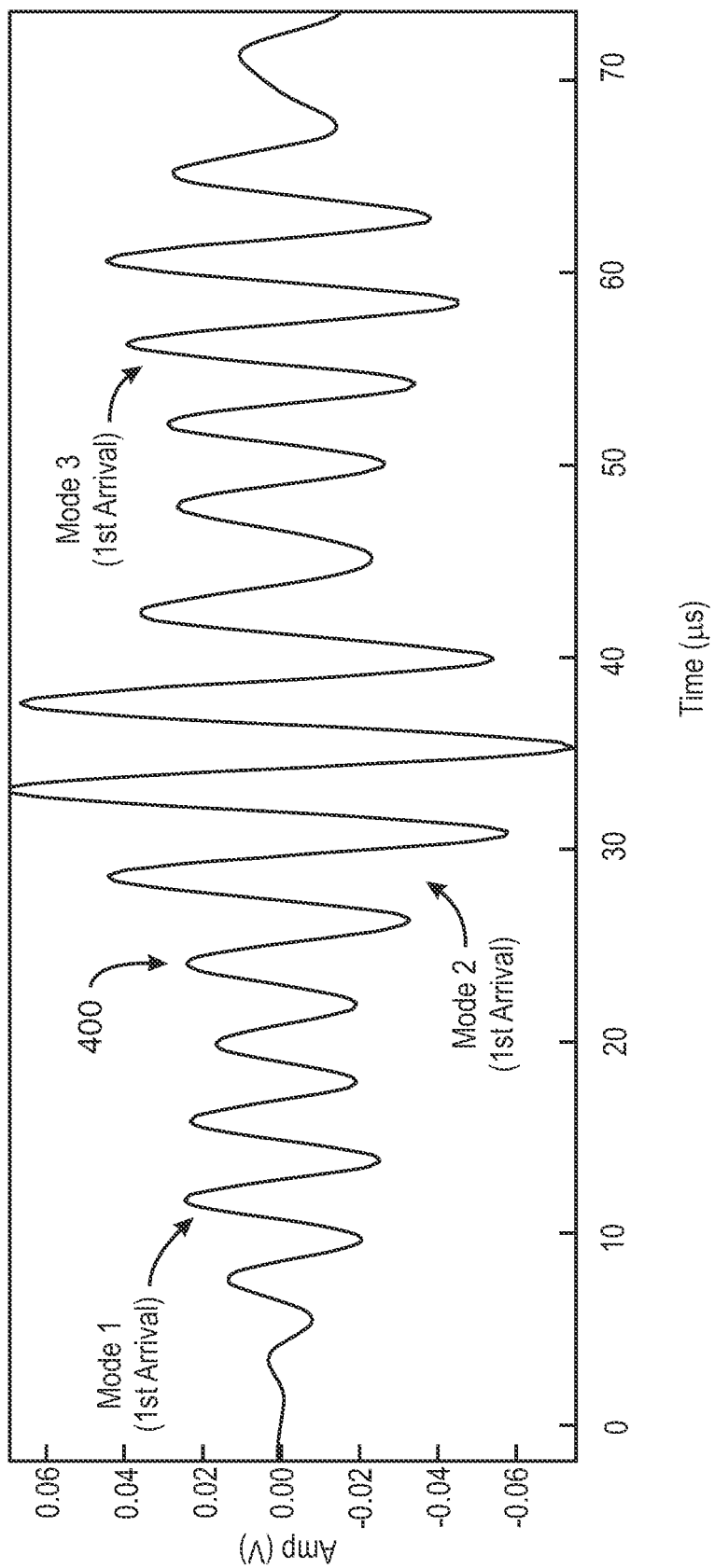
FIG. 4A is a graph showing the amplitude as a function of time for an acoustic signal resulting from an excitation pulse generated at a frequency of 220 kHz.
Figure 4B:
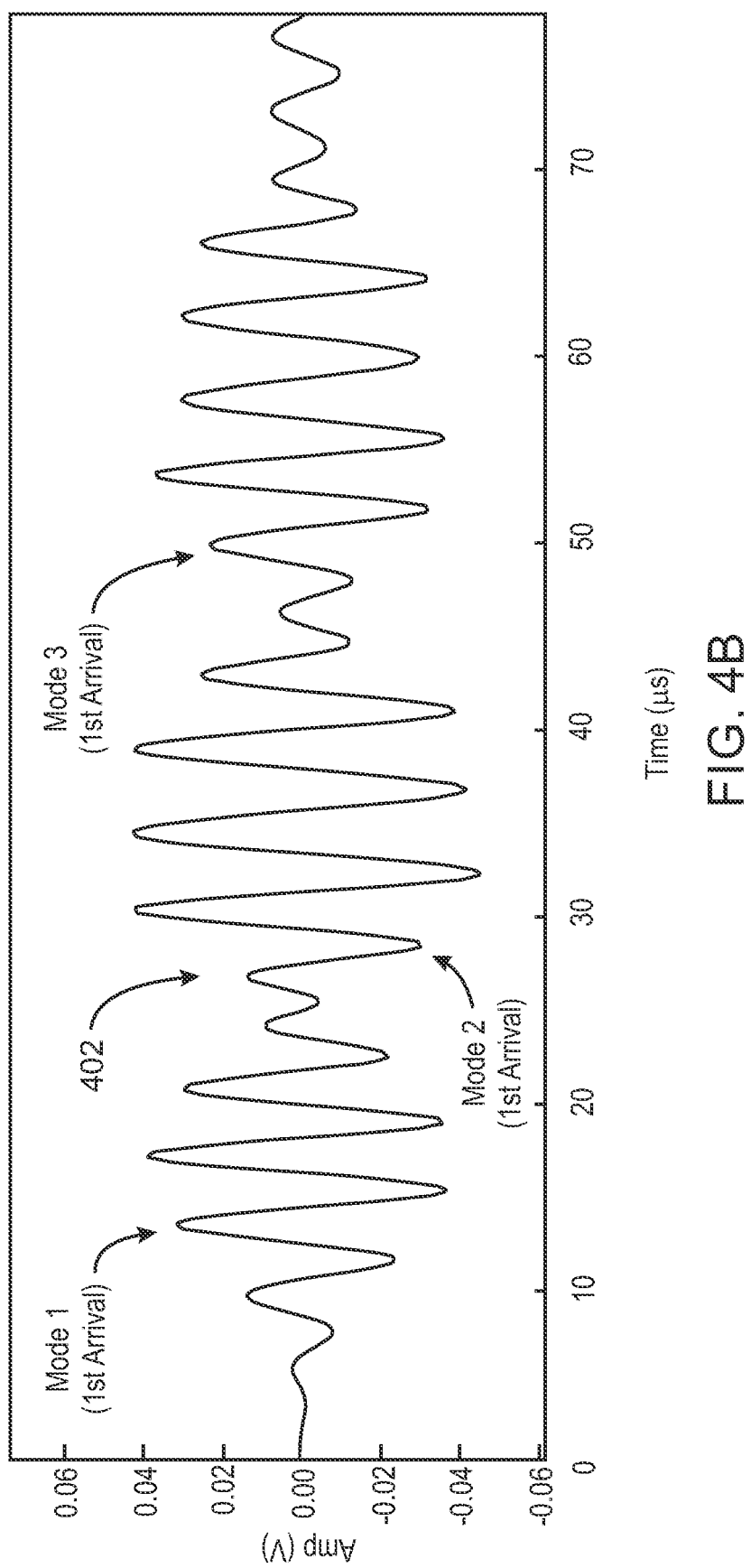
FIG. 4B is another graph showing the amplitude as a function of time for an acoustic signal resulting from an excitation pulse generated at a frequency of 260 kHz.

FIGS. 4A and 4B show the effects of selecting two different frequencies for generating the excitation pulse in a smaller-diameter pipe. Specifically, FIG. 4A is a graph showing the amplitude as a function of time for an acoustic signal 400 resulting from an excitation pulse generated at a frequency of 220 kHz. Similarly, FIG. 4B is a graph showing the amplitude as a function of time for an acoustic signal 402 resulting from an excitation pulse generated at a frequency of 260 kHz. Both excitation pulses were generated within a 4-in. (or 10.2-cm), Schedule 40 stainless steel pipe as Hanning windowed 5-cycle sinusoidal pulses. As shown in FIG. 4A, at a frequency of 220 kHz, Mode 2 and Mode 3 are clearly separated in time, while Mode 1 and Mode 2 are not. On the other hand, as shown in FIG. 4B, all three modes are clearly separated in time at a frequency of 260 kHz. By comparing the graphs shown in FIGS. 4A and 4B to the graphs shown in FIGS. 3A and 3B, it becomes clear that the ideal frequency for generating the excitation pulse varies according to the specific properties of the corresponding pipe or vessel, as described above.

In various embodiments, the Hanning windowed 5-cycle sinusoidal wave is selected due to its energy efficiency and its ability to generate a waveform containing a relatively narrow frequency band. It has been observed that the degree of mode separation is frequency-dependent, and more specifically, the narrower the frequency band, the better the mode separation. Other types of acceptable pulses or windowed waveform envelopes may include Kaiser waveforms, Blackmann waveforms, Olivia waveforms, and the like. The number of waveform cycles may also be varied as needed to improve mode separation.

According to embodiments described herein, the separation of the guided acoustic wave modes allows for multi-parameter sensing without complicated signal processing. Moreover, the selection of an optimal frequency for generating the acoustic excitation pulse is a key factor for accomplishing the separation of the guided acoustic wave modes. In various embodiments, both theoretical calculations and experimental tests are used to select the optimal frequency, as described further with respect to FIG. 5.

Figure 5:
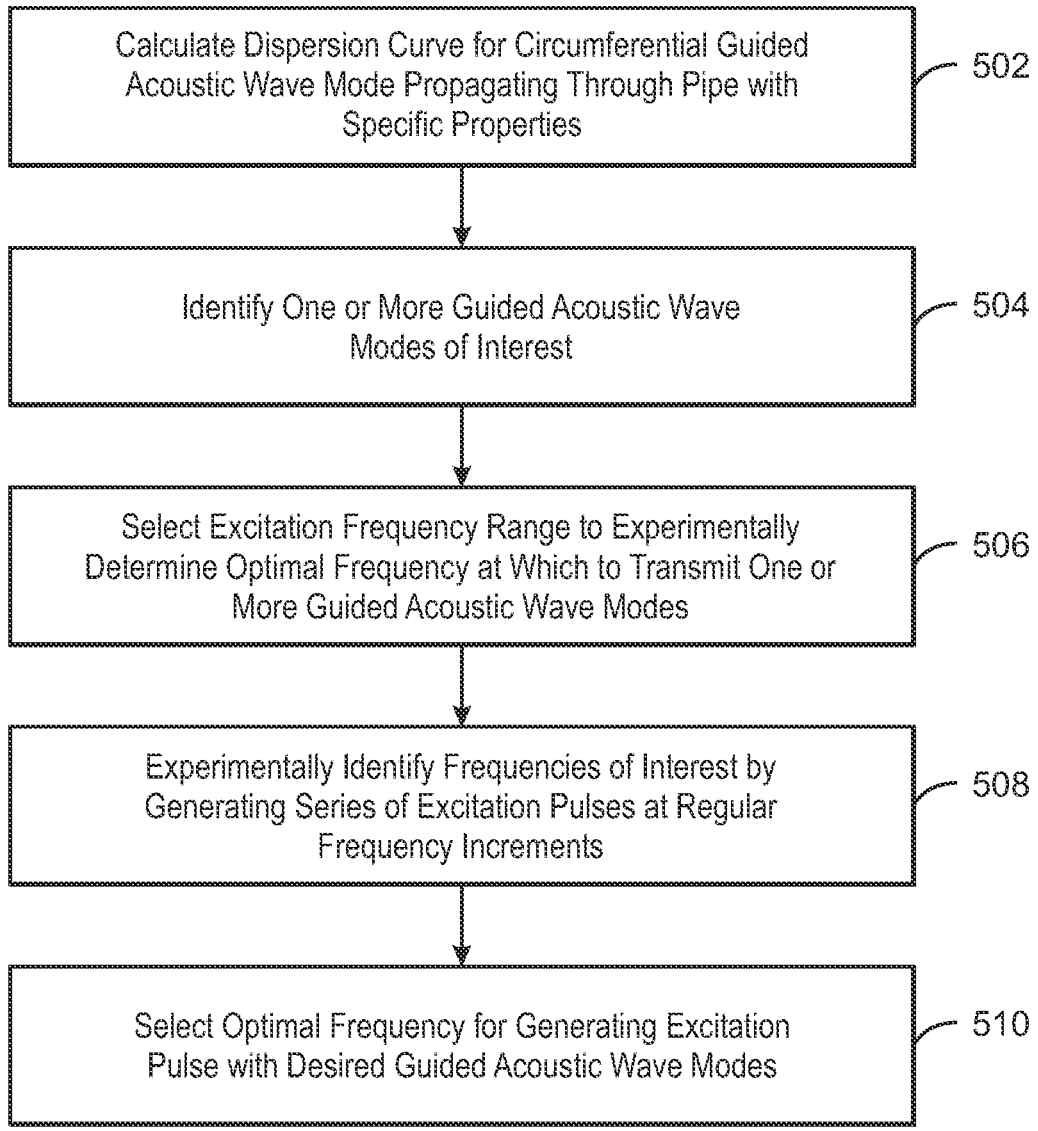
FIG. 5 is a process flow diagram of a method for selecting an optimal frequency for generating acoustic waves with the desired guided acoustic wave modes according to embodiments described herein.

Exemplary Method for Selecting Optimal Frequency for Generating Acoustic Waves with Desired Guided Acoustic Wave Modes FIG. 5 is a process flow diagram of a method 500 for selecting an optimal frequency for generating acoustic waves with the desired guided acoustic wave modes according to embodiments described herein. The method 500 begins at block 502, at which a dispersion curve is calculated for a circumferential guided acoustic wave mode propagating through a pipe with specific properties, i.e., a pipe with a specific size, shape, and/or composition (or, more specifically, a pipe with a specific diameter, wall thickness, material-related sound speed, and the like). This, in turn, allows for the identification of one or more guided acoustic wave modes of interest at block 504. Once the one or more guided acoustic wave modes of interest are identified, the method 500 proceeds to block 506, at which an excitation frequency range is selected to experimentally determine an optimal frequency at which to transmit the one or more guided acoustic wave modes. In various embodiments, the excitation frequency range is selected based on known frequency ranges for other, similar pipe sizes, shapes, and/or compositions.

At block 508, frequencies of interest are experimentally identified by generating a series of excitation pulses at regular frequency increments within the excitation frequency range. In some embodiments, this includes generating Hanning windowed 5-cycle sinusoidal pulses at 5 kHZ frequency increments. However, in other embodiments, other types of excitation pulses and/or other frequency increments may be used.

Finally, at block 510, an optimal, or characteristic, frequency is selected for generating an excitation pulse with the desired guided acoustic wave modes. Specifically, the optimal frequency is selected such that the resulting guided acoustic wave modes are easily separable without complicated signal processing. Moreover, the selected optimal frequency is tailored to the properties of the particular pipe, such as the pipe size, shape, and/or composition (or, more specifically, the pipe diameter, wall thickness, material-related sound speed, and the like). Furthermore, if more than one optimal frequency is discovered, then any one of the discovered frequencies may be used for generating the excitation pulse. In some cases, the other discovered frequency or frequencies may also be used, either for purposes of redundancy or to double-check the results obtained using the selected frequency.

The process flow diagram of FIG. 5 is not intended to indicate that the steps of the method 500 are to be executed in any particular order, or that all of the steps of the method 500 are to be included in every case. Further, any number of additional steps not shown in FIG. 5 may be included within the method 500, depending on the details of the specific implementation.

Exemplary Sensing Applications for Non-Intrusive Parameter Detection Techniques Described Herein FIG. 6 is a table 600 showing the utility of each guided acoustic wave mode described herein (i.e., Mode 1, Mode 2, and Mode 3) for detecting specific parameters relating to pipes/vessels. Specifically, the table 600 shows whether each guided acoustic wave mode can be used for the following sensing applications: multiphase flow detection, liquid level detection, wax deposition detection in an air-filled or water-filled pipe, and sand level detection in a water-filled pipe. As shown in the table 600, the C-SH acoustic wave mode (i.e. Mode 1), which travels within the wall of the pipe, is sensitive to pressure but substantially immune to the other pipe parameters described herein and, thus, cannot be effectively used for any of the listed sensing applications, except as a means of compensating for pressure fluctuations within the pipe and variations in transducer installation (or, in other words, as a means of calibrating the measurements). By contrast, the C-LT acoustic wave mode (i.e. Mode 2), which travels within the wall of the pipe, is sensitive to the near-surface region of the pipe and, thus, can be effectively used for all of the listed sensing applications. Similarly, the CA acoustic wave mode (i.e., Mode 3), which travels through the fluid within the pipe cavity, is sensitive to the fluid (or other media) inside the pipe cavity and, thus, can also be effectively used for all of the listed sensing applications.

The following figures provide experimental results relating to the different sensing applications described herein. As illustrated by the table 600, the non-intrusive parameter detection techniques described herein exploit the sensitivity differences of the guided acoustic wave modes (e.g., Mode 1, Mode 2, and Mode 3) to the surrounding media. Specifically, as a result of such sensitivity differences, different parameters relating to the pipe can be measured by selectively generating, propagating, and detecting specific individual or combined guided acoustic wave modes. In some embodiments, this involves separating and/or combining two or more guided acoustic wave modes to determine various parameters relating to the surrounding media. Moreover, several different signal processing methods can be used to analyze the resulting acoustic signals to determine quantitative measurements relating to the various parameters. Such signal processing methods may include, for example, analyzing the root mean square (RMS) values, phase velocities, and/or waveform shapes for each mode within the acoustic signal.

Exemplary Sensing Application 1: Multiphase Flow Detection

For sensing applications relating to detecting multiphase flow within the pipe/vessel, Mode 2 and/or Mode 3 can be used to characterize the liquid/gas content inside the pipe. Because Mode 1 is not affected, it can be used to compensate for pressure fluctuations within the pipe through measurements of the time-of-flight of the acoustic wave mode, as well as to compensate for variations in transducer installation through monitoring of the amplitude of the acoustic wave mode. In other words, Mode 1 may be used to calibrate the measurements. An exemplary implementation of this sensing application is described with respect to FIGS. 7A and 7B.

Figure 7A:
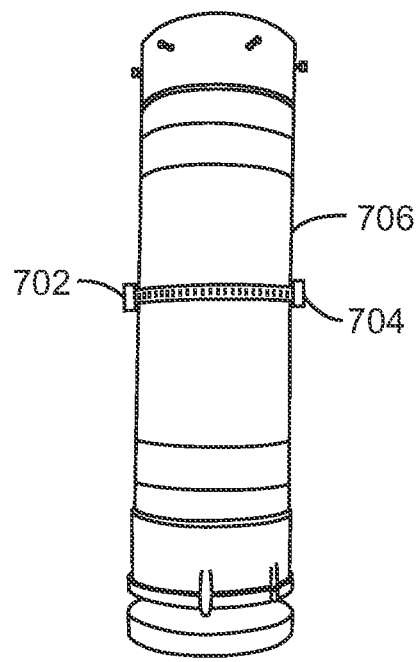
FIG. 7A is a schematic view of an experimental setup including two piezoelectric transducers clamped outside a vertically-oriented pipe for multiphase flow detection.

FIG. 7A is a schematic view of an experimental setup 700 including two piezoelectric transducers 702 and 704 clamped outside a vertically-oriented pipe 706 for multiphase flow detection. For this experiment, the multiphase flow included a mixture of water and air flowing inside the pipe cavity. According to the experimental setup 700, the two piezoelectric transducers 702 and 704 were arranged in a pitch-catch (or transmit-receive) mode configuration, in which the first piezoelectric transducer 702 transmitted Hanning windowed 5-cycle sinusoidal excitation pulses at 200 kHz and the second piezoelectric transducer 704 received the resulting acoustic signals.

Figure 7B:
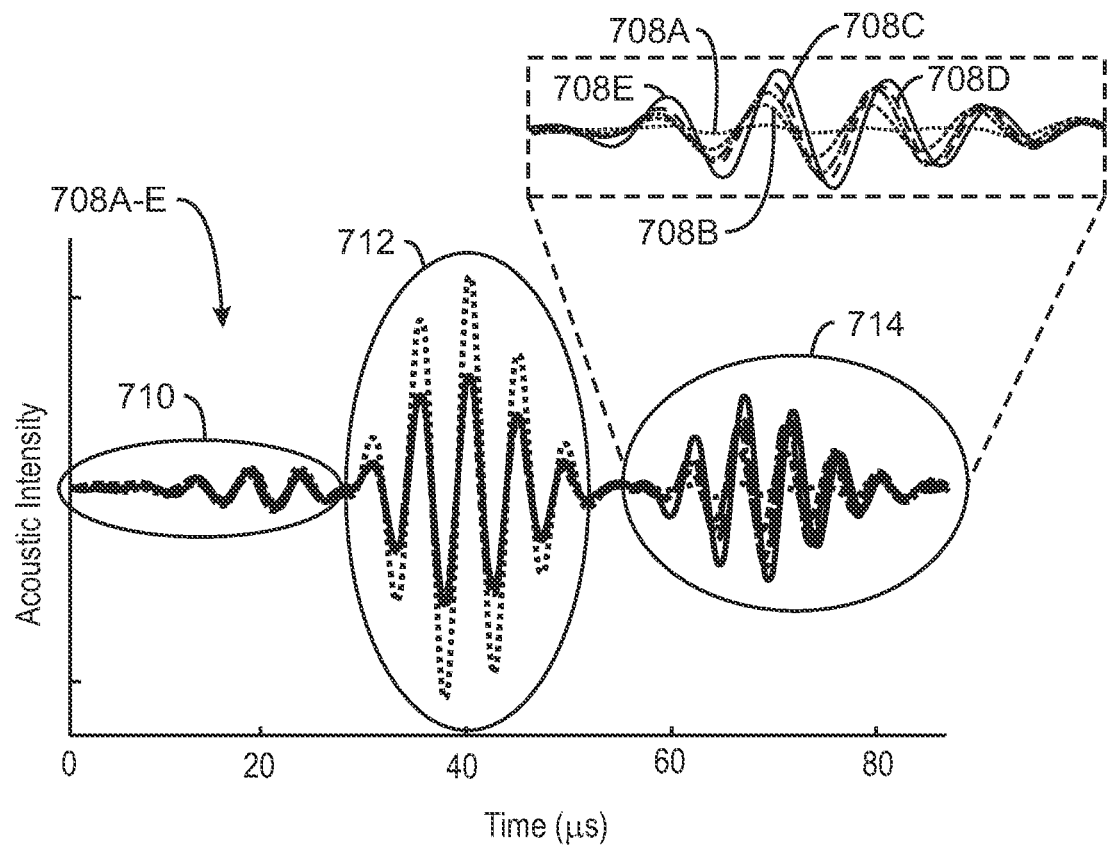
FIG. 7B is a graph showing the acoustic signals that were generated and detected using the first piezoelectric transducer and the second piezoelectric transducer, respectively, according to the experimental setup of FIG. 7A.

FIG. 7B is a graph showing the acoustic signals 708A-E that were generated and detected using the first piezoelectric transducer 702 and the second piezoelectric transducer 704, respectively, according to the experimental setup 700 of FIG. 7A. During the experiment, the acoustic signals were generated and detected under five separate conditions. Specifically, the first acoustic signal 708A was generated and detected with only air inside the pipe 706; the second acoustic signal 708B was generated and detected with an increased air bubble volume inside the pipe 706; the third acoustic signal 708C was generated and detected with a further increased air bubble volume inside the pipe 706; the fourth acoustic signal 708D was generated and detected with a still further increased air bubble volume inside the pipe 706; and the fifth acoustic signal 708E was generated and detected with only water inside the pipe 706.

The experiment revealed that Mode 1, which is depicted at 710, was not sensitive to the multiphase flow within the pipe 706. However, Mode 3, which is depicted at 712, had a change in amplitude when the composition of the flow within the pipe 706 changed, i.e., from all air to air bubble-filled water to pure water). Specifically, as shown in FIG. 7B, Mode 2 was attenuated when the pipe 706 was filled with water, but did not show any sensitivity to the amount of air bubbles inside the pipe 706. This is due to the fact that most of the air bubbles were not in contact with the wall of the pipe 706, and Mode 2 is only sensitive to the near-surface region of the pipe 706.

In contrast, Mode 3 is sensitive to the fluid (or other media) inside the pipe cavity. Therefore, Mode 3, as depicted at 714, can be used for multiphase flow detection across the cavity of the pipe 706 (or, in other words, across the inner diameter of the pipe 706). For example, according to the experiment discussed with respect to FIGS. 7A and 7B, Mode 3 can be used for more sensitive detection of the amount of air bubbles inside the water within the pipe 706. The graph of FIG. 7B reveals that Mode 3 can be used to identify a two-phase fluid (e.g., liquid/gas mixture) based on the change in the phase velocity and/or the change in the amplitude of the mode as it propagates through the fluid inside the pipe 706. More specifically, the graph reveals a reduction in phase velocity and an attenuation in amplitude for Mode 3 when more air bubbles were introduced into the water. Accordingly, the amplitude and the phase velocity can be combined together, or used separately, to quantify the volume fraction of the gas within the fluid inside the pipe 706. Moreover, because a low-frequency signal is used according to embodiments described herein, the attenuation of the signal is lower, allowing the signal to travel a longer distance inside the pipe cavity. This, in turn, allows larger-diameter pipes/vessels to be used. In addition, this allows the signal to reflect back and forth within the pipe cavity several times, providing more measurement opportunities. Furthermore, these longer acoustic pathways allow for more accurate phase velocity and attenuation measurements, which can be used to detect low gas concentrations inside the pipe cavity.

Exemplary Sensing Application 2: Liquid Level Detection

For sensing applications relating to liquid level detection within the pipe/vessel, Mode 2 and/or Mode 3 can be used to characterize the liquid level inside the pipe. Because Mode 1 is not affected, it can be used to compensate for pressure fluctuations within the pipe through measurements of the time-of-flight of the acoustic wave mode, as well as to compensate for variations in transducer installation through monitoring of the amplitude of the acoustic wave mode. In other words, Mode 1 may be used to calibrate the measurements. An exemplary implementation of this sensing application is described with respect to FIGS. 8A, 8B, 8C, and 8D.

Figure 8A:
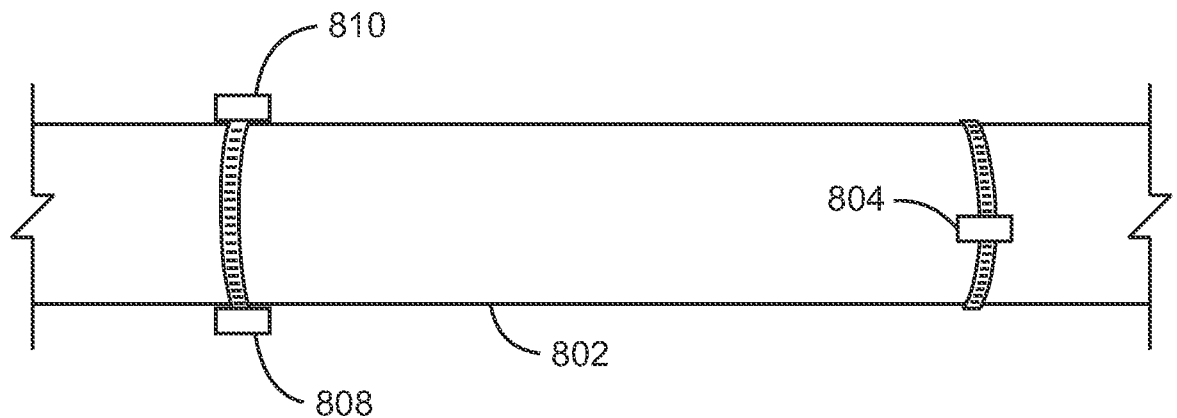
FIG. 8A is a schematic view of an experimental setup including two pairs of piezoelectric transducers clamped outside a horizontally-oriented pipe for liquid level detection.
Figure 8B:
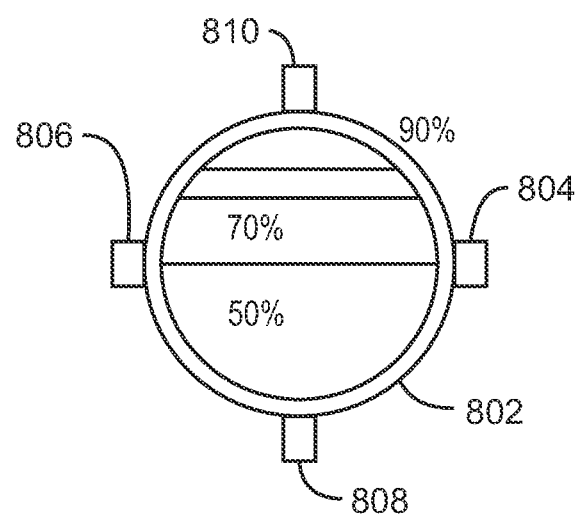
FIG. 8B is a cross-sectional schematic view of the pipe showing the two pairs of piezoelectric transducers used for the experimental setup of FIG. 8A.

FIG. 8A is a schematic view of an experimental setup 800 including two pairs of piezoelectric transducers clamped outside a horizontally-oriented pipe 802 for liquid level detection. Similarly, FIG. 8B is a cross-sectional schematic view of the pipe 802 showing the two pairs of piezoelectric transducers used for the experimental setup 800 of FIG. 8A. More specifically, the experimental setup 800 includes a first pair of piezoelectric transducers positioned along the horizontal direction, including a first piezoelectric transducer 804 located at 3 o'clock and a second piezoelectric transducer 806 located at 9 o'clock, as well as a second pair of piezoelectric transducers positioned along the vertical direction, including a third piezoelectric transducer 808 located at 6 o'clock and a fourth piezoelectric transducer 810 located at 12 o'clock. Both pairs of piezoelectric transducers were arranged in a pitch-catch (or transmit-receive) mode configuration, in which one transducer in each pair (i.e., the first piezoelectric transducer 804 and the third piezoelectric transducer 808) transmitted a Hanning windowed 5-cycle sinusoidal excitation pulse, while the second transducer in each pair (i.e., the second piezoelectric transducer 806 and the fourth piezoelectric transducer 810) received the corresponding acoustic signal.

Figure 8C:
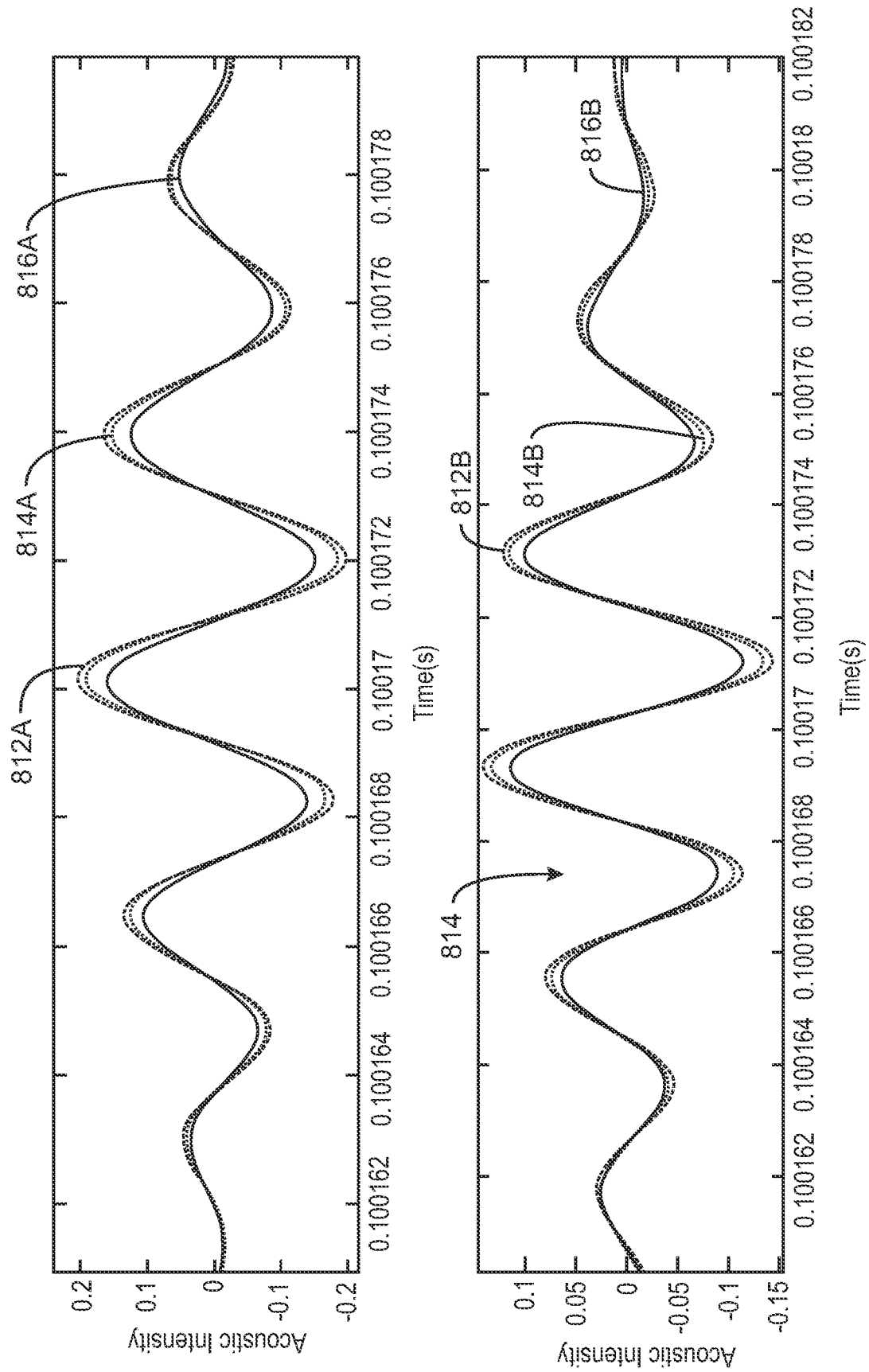
FIG. 8C includes two graphs showing acoustic signals corresponding to the C-LT acoustic wave mode that were generated and detected using the first pair of piezoelectric transducers and the second pair of piezoelectric transducers, respectively, according to the experimental setup of FIGS. 8A and 8B.

FIG. 8C includes two graphs showing acoustic signals corresponding to the C-LT acoustic wave mode (i.e., Mode 2) that were generated and detected using the first pair of piezoelectric transducers and the second pair of piezoelectric transducers, respectively, according to the experimental setup 800 of FIGS. 8A and 8B. Similarly, FIG. 8D includes two graphs showing a more detailed view of acoustic signals corresponding to all three acoustic wave modes (i.e., Modes 1, 2 and 3) that were generated and detected using the first pair of piezoelectric transducers and the second pair of piezoelectric transducers, respectively, according to the experimental setup of FIGS. 8A and 8B. During the experiment, the pipe 802 was filled with different levels of water, i.e., 50% water level, 70% water level, and 90% water level, as shown in FIG. 8B. For each water level, the pairs of transducers were used to generate and detect corresponding acoustic signals. Specifically, acoustic signals 812A and 812B correspond to a 50% water level; acoustic signals 814A and 814B correspond to a 70% water level; and acoustic signals 816A and 816B correspond to a 90% water level. These acoustic signals reveal that the amplitude of Mode 2, as depicted at 820A and 820B in FIG. 8D, decreased proportionally to the amount of additional water introduced into the pipe 802. Moreover, because Mode 2 is sensitive to the near-surface region of the pipe 802, this amplitude attenuation was related to the area of water coverage for the inner surface of the pipe 802. Due to this correlation, the amplitude measurements for Mode 2 can be used to infer the amount of inner surface coverage provided by the water within the pipe 802 or, in other words, the liquid level within the pipe 802. Furthermore, it should be noted that the degree of amplitude attenuation did not vary significantly based on whether the acoustic signal was generated and detected by the horizontally-installed or vertically-installed transducer pair (i.e., the first pair transducer pair or the second transducer pair, respectively).

FIG. 8D also reveals that Mode 1, as depicted at 818A and 818B, is not sensitive to the liquid level within the pipe 802. In addition, FIG. 8D reveals the Mode 3, as depicted at 822A and 822B, was a function of the water level, and the sensitivity of Mode 3 depended on the locations of the transducers within the transducer pairs. Specifically, due to the parallel acoustic pathways between the water and the air within the pipe 802, Mode 3 was sensitive to the horizontally-installed transducer pair at lower water levels, e.g., the 50% water level, as shown at 816A. However, due to the serial acoustic pathway between the water and the air within the pipe 802, Mode 3 was sensitive to the vertically-installed transducer pair at higher water levels, e.g., the 70% water level and the 90% water level, as shown at 816B. Therefore, according to embodiments described herein, Mode 3 can be analyzed to determine the air pocket distribution inside the pipe 802.

In various embodiments, liquid level and multiphase flow conditions within a pipe can be simultaneously monitored by deploying multiple transducer pairs along some length of the pipe (e.g., in pitch-catch mode configuration), or by deploying multiple single transducers along some length of the pipe (e.g., in pulse-echo mode configuration). Specifically, Mode 2 and Mode 3 of the acoustic signals generated and detected by each transducer pair (or single transducer) can be analyzed to determine the sizes and locations of air pockets and liquid contact area within the pipe cavity.

Exemplary Sensing Application 3: Wax Deposition Detection

For sensing applications relating to wax deposition detection within the pipe/vessel, Mode 2 and/or Mode 3 can be used to characterize the wax deposition inside the pipe. Because Mode 1 is not affected, it can be used to compensate for pressure fluctuations within the pipe through measurements of the time-of-flight of the acoustic wave mode, as well as to compensate for variations in transducer installation through monitoring of the amplitude of the acoustic wave mode. In other words, Mode 1 may be used to calibrate the measurements. Two exemplary implementations of this sensing application are described with respect to FIGS. 9 and 10. Moreover, it should be noted that this exemplary implementation applies equally to deposits of scale, gas hydrates, asphaltenes, and other deposits that may form within the pipe.

Figure 9:
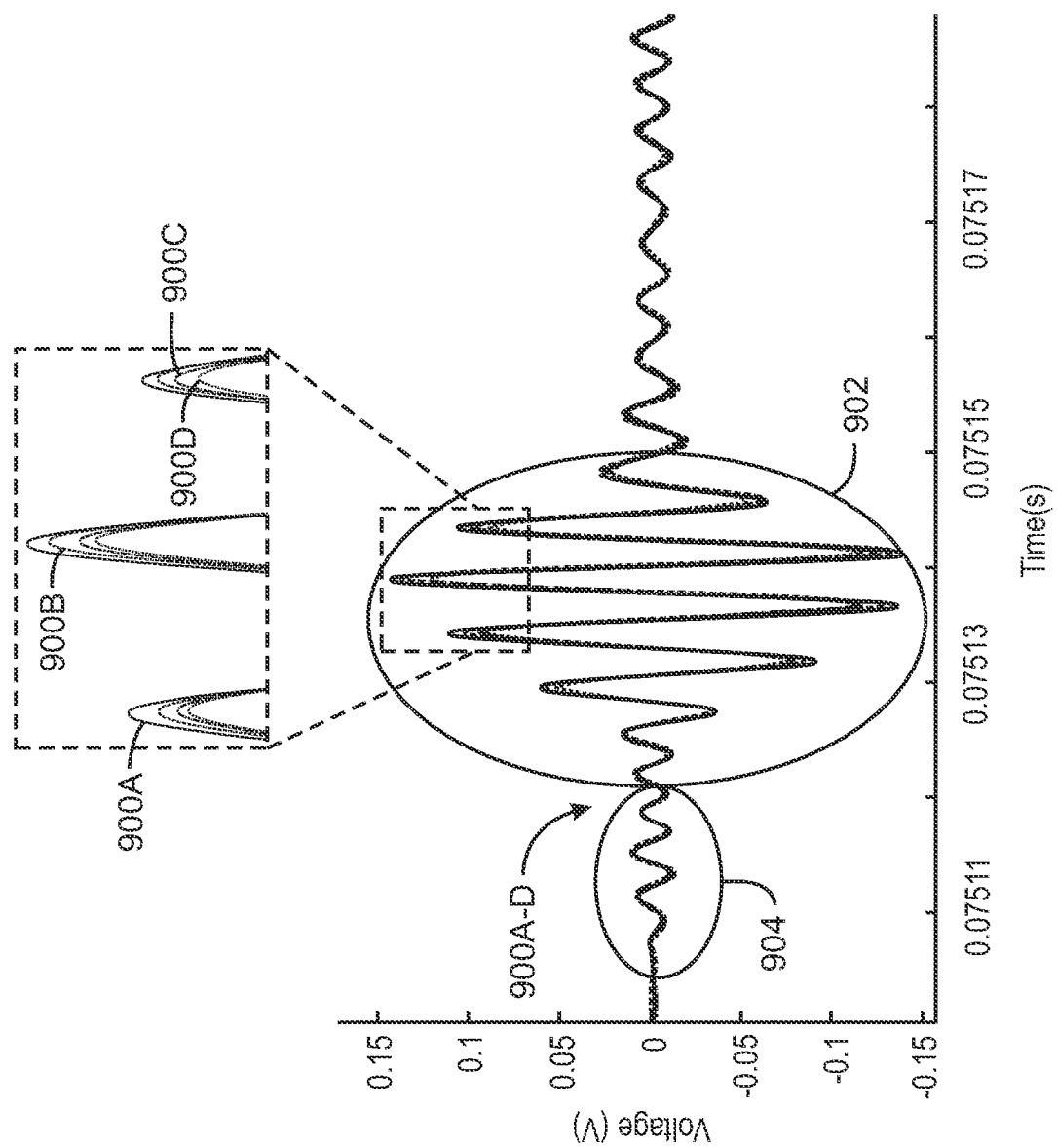
FIG. 9 is a graph showing acoustic signals that can be analyzed to determine the amount of wax deposition in an air-filled pipe according to embodiments described herein.

FIG. 9 is a graph showing acoustic signals 900A-D that can be analyzed to determine the amount of wax deposition in an air-filled pipe according to embodiments described herein. For this exemplary implementation, Mode 2 is utilized, as shown at 902. However, Mode 3 is not present. Moreover, while Mode 1 is present, as shown at 904, it is only used for calibration purposes.

The acoustic signals 900A-D shown in FIG. 9 were generated and detected using an experimental setup including a 5-in., Schedule 40 stainless steel pipe with two piezoelectric transducers arranged in a pitch-catch (or transmit-receive) mode configuration around the outside of the pipe (i.e., in the same configuration as shown in FIG. 7A). The acoustic signals 900A-D were generated and detected under four separate conditions. Specifically, the first acoustic signal 900A was generated and detected with only air inside the pipe; the second acoustic signal 900B was generated and detected with wax covering 10% of the pipe circumference; the third acoustic signal 900C was generated and detected with wax covering 50% of the pipe circumference; and the fourth acoustic signal 900D was generated and detected with wax covering 80% of the pipe circumference. Moreover, it should be noted that, for this experiment, the wax was mainly applied circumferentially close to the transducer locations.

As shown in the graph, the amplitude of Mode 2 within the acoustic signals 900A-D decreased as more wax was added to the inner surface of the pipe. In particular, the amplitude of Mode 2 started to decrease once a layer of wax about 1 millimeter (mm) thick and 20 mm wide was applied to the inner surface of the pipe. This decrease in amplitude was caused by acoustic energy leaks from the pipe wall to the wax. Furthermore, this decrease in amplitude provides a basis for analyzing Mode 2 of the acoustic signals to determine the amount of wax deposition within the pipe, as well as fluctuations in the amount of wax deposition over time.

Figure 10:
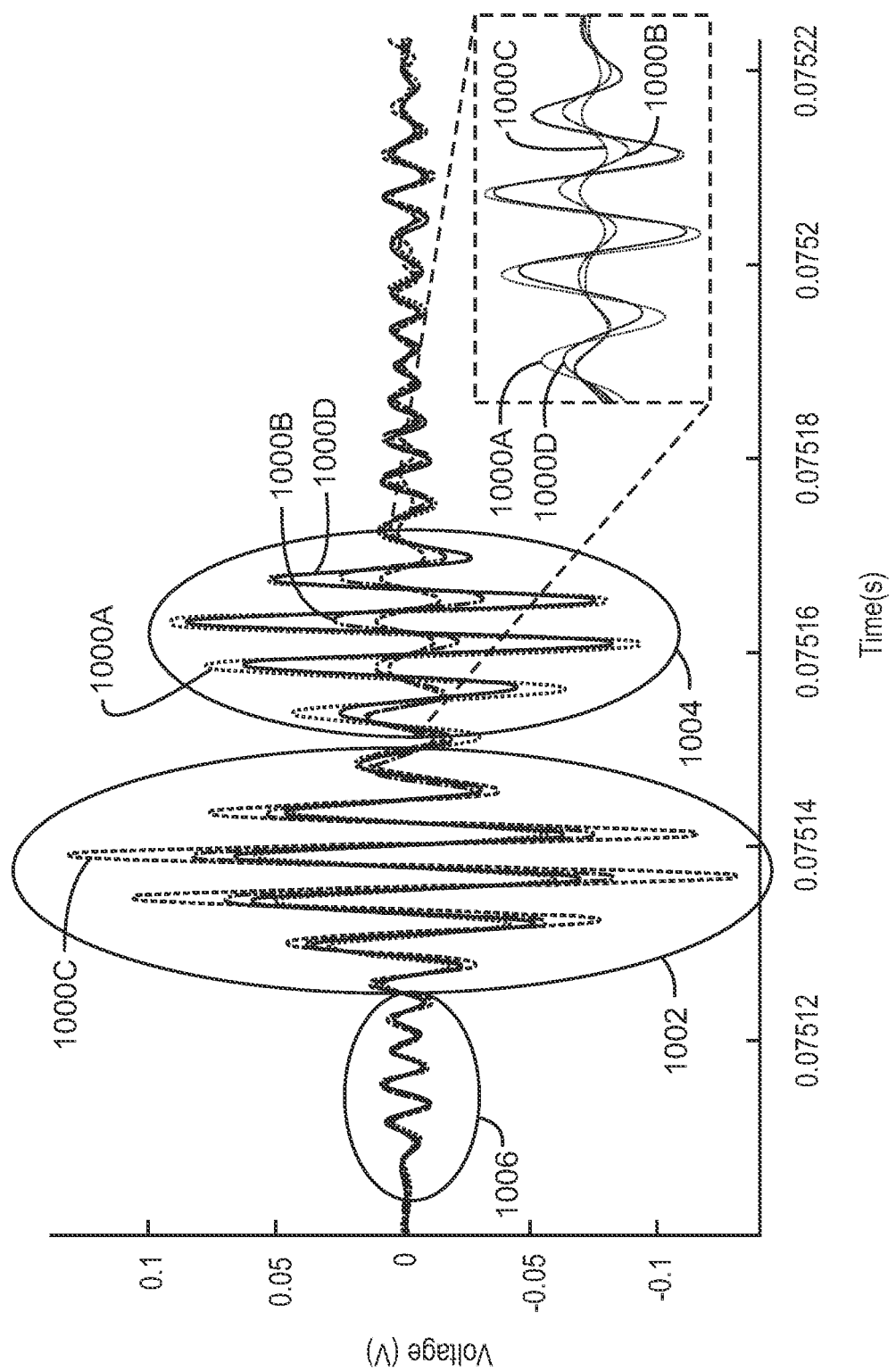
FIG. 10 is a graph showing acoustic signals that can be analyzed to determine the amount of wax deposition in a water-filled pipe according to embodiments described herein.

FIG. 10 is a graph showing acoustic signals 1000A-D that can be analyzed to determine the amount of wax deposition in a water-filled pipe according to embodiments described herein. For this exemplary implementation, Mode 2 and/or Mode 3 are utilized, as shown at 1002 and 1004, respectively. Moreover, while Mode 1 is present, as shown at 1006, it is only used for calibration purposes.

The acoustic signals 1000A-D shown in FIG. 10 were generated and detected using the same experimental setup described with respect to FIG. 9. In addition, the acoustic signals 1000A-D were generated and detected under four separate conditions. Specifically, the first acoustic signal 1000A was generated and detected with only water inside the pipe; the second acoustic signal 1000B was generated and detected with a 0.5 in.-wide layer of wax covering the inner surface of the pipe; the third acoustic signal 1000C was generated and detected with a 1.25-in.-wide layer of wax covering the inner surface of the pipe; and the fourth acoustic signal 1000D was generated and detected with a 0.5 in.-wide layer of wax covering the transducers only.

As shown in the graph, when the pipe is filled with water only, Mode 3 is measurable. Moreover, both Mode 2 and Mode 3 can be used to characterize the amount of wax deposition inside the pipe. Specifically, when the wax is applied to the inner surface of the pipe, the amplitude of Mode 2 increases due to the acoustic energy leakage from the pipe wall into the water. On the other hand, the amplitude of Mode 3 decreases as more wax is deposited on the inner surface of the pipe due to less acoustic energy being coupled into the water. Furthermore, for this exemplary implementation, the graph reveals that Mode 3 is more sensitive than Mode 2 and is, thus, more effective for monitoring wax deposition within a water-filled pipe.

Exemplary Sensing Application 4: Sand Deposition Detection

For sensing applications relating to sand deposition detection within the pipe/vessel, Mode 2 and/or Mode 3 can be used to characterize the sand deposition inside the pipe. Because Mode 1 is not affected, it can be used to compensate for pressure fluctuations within the pipe through measurements of the time-of-flight of the acoustic wave mode, as well as to compensate for variations in transducer installation through monitoring of the amplitude of the acoustic wave mode. In other words, Mode 1 may be used to calibrate the measurements. An exemplary implementation of this sensing application is described with respect to FIGS. 11A and 11B.

Figure 11A:
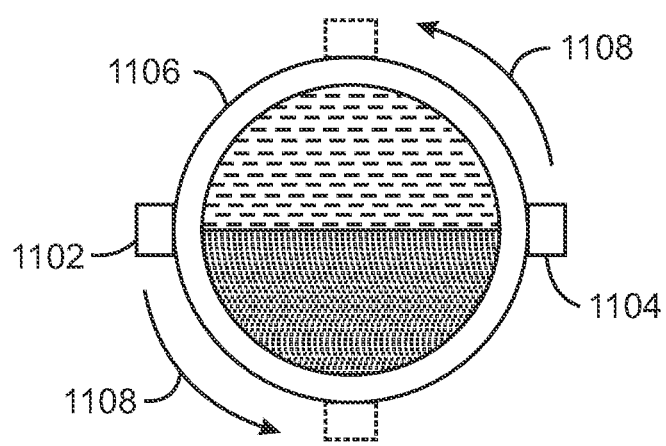
FIG. 11A is a cross-sectional schematic view of an experimental setup including a pair of piezoelectric transducers clamped outside a horizontally-oriented, water-filled pipe for detecting a level of sand deposition within the pipe.

FIG. 11A is a cross-sectional schematic view of an experimental setup 1100 including a pair of piezoelectric transducers 1102 and 1104 clamped outside a horizontally-oriented, water-filled pipe 1106 for detecting a level of sand deposition within the pipe 1106. For this experiment, the pipe 1106 was rotated, as indicated by arrows 1108, to positions where the pair of piezoelectric transducers 1102 and 1104 were in either a horizontal or a vertical position, and measurements were taken after each rotation once the sand within the pipe 1106 had time to the settle into the bottom section of the pipe 1106. The goal of rotating the pipe 1106 was to analyze the sensitivities of guided acoustic wave modes generated at different locations and, thus, to optimize the transducer installation locations according to embodiments described herein.

Figure 11B:
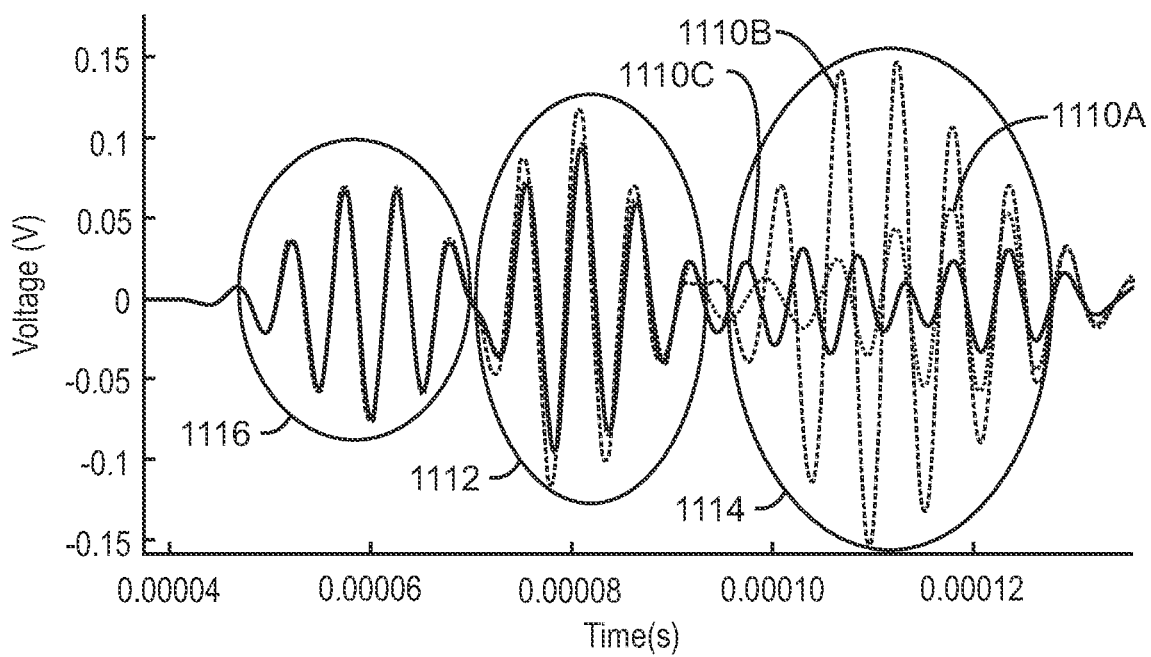
FIG. 11B is a graph showing three acoustic signals that were generated and detected using the experimental setup described with respect to FIG. 11A.

FIG. 11B is a graph showing three acoustic signals 1110A-C that were generated and detected using the experimental setup 1100 described with respect to FIG. 11A. Specifically, a first acoustic signal 1110A was generated when the transmitting piezoelectric transducer was located at the top of the pipe 1106 in the vertical position; the second acoustic signal 1110B was generated when the transmitting piezoelectric transducer was located at one side of the pipe 1106 in the horizontal position; and the third acoustic signal 1110C was generated when the transmitting piezoelectric transducer was located at the bottom of the pipe 1106 in the vertical position. For all three conditions, there was no significant difference in the amplitude of Mode 1, as shown at 1116. However, as shown at 1112, the amplitudes of Mode 2 were lower for the two acoustic signals 1110A and 1110C generated from the vertical positions as compared to the acoustic signal 1110B generated from the horizontal position. In addition, as shown at 1114, Mode 3 attenuated differently depending on the location at which the acoustic signals 1110A-C were generated, i.e., the position of the transmitting transducer. Specifically, the acoustic signal 1110B generated from the horizontal position had a higher amplitude compared to the two acoustic signals 1110A and 1110C generated from the vertical positions, with the acoustic signal generated from the bottom vertical position having the lowest amplitude overall.

Exemplary Sensing Application 5: Flow Rate Detection

Because the acoustic transducers described herein are installed directly across the pipe diameter and perpendicular to the direction of flow, the resulting acoustic signal is immune to Doppler effect flow. Therefore, to measure the flow rate inside the pipe, a pair of acoustic transducers (or multiple pairs of acoustic transducers) can be clamped outside the pipe and separated at a certain distance, i.e., located at specific locations (referred to as "nodes") along the length of the pipe. For example, a particular pipe may include 5-20 nodes, with a distance of about 0.2 to 20 meters between each node. Measurements taken at each node can then be analyzed to identify the guided acoustic wave modes within the acoustic signal. Specifically, the data corresponding to the phase velocity of the CA acoustic wave mode within each node can be analyzed to detect a pattern of flow for each node, and the change in the flow rate within the pipe can then be calculated based on a combination of known separation distances between each node and the calculated pattern of flow for each node. In some embodiments, the change in the flow rate is provided as a two-dimensional tomographic image of the flow profile within the pipe. This method for flow rate detection may be especially useful when the pipe includes turbulent flow conditions and/or non-homogenous, complex mixtures, such as, for example, one or more slugs, flowing through the pipe. Alternatively, in some embodiments, measurements taken at different nodes can then be cross-correlated to identify the propagation time, which is the amount of time it takes for the signal to travel from one node to another neighboring node along the length of the pipe. The flow rate within the pipe can then be calculated using the known separation distances in combination with the measured propagation time. Moreover, in various embodiments, Mode 3 of the acoustic signal is primarily used for this sensing application since Mode 3 travels through the pipe cavity and is sensitive to the fluid inside the pipe cavity.

Furthermore, according to embodiments described herein, multiple nodes may also be used for any of the other sensing applications described herein. For example, multiple nodes may be used to actively determine how the fluid properties change as the fluid flows through the pipe. This may be useful for providing alerts regarding impending negative conditions in environments where there is a high risk of deposits or phase changes. For example, in hydrocarbon processing applications, multiple nodes may be used to alert operators when hydrates are about to form within a particular pipeline, and/or to alert operators about the size, speed, and/or composition of a slug flowing through the pipeline. Therefore, taking measurements at multiple nodes in this manner may allow transient conditions within the pipe to be continuously monitored and controlled.

Moreover, in various embodiments, the same advantages can be realized using only a single node. For example, a single node may also be used to actively determine how the fluid properties change over time, thus providing alerts regarding impending negative conditions. For example, in hydrocarbon processing applications, a single key location, such as the top of the reservoir within the well, may be monitored using a single node to determine, for example, the asphaltene onset pressure (AOP) at that location. This may be particularly beneficial for embodiments in which it is too cost-prohibitive or time-consuming to monitor multiple locations.

In addition, in some embodiments in which multiple nodes are used, each node includes a pair of acoustic transducers configured for pitch-catch mode operations, or a single transducer configured for pulse-echo operations. In such embodiments, each node is configured to obtain signal readings independently of the other nodes. In other embodiments, each node includes a single transducer that is configured for pitch-catch mode operations with neighboring nodes. For example, a first node may pitch a signal to a second node, which receives the signal and then pitches a signal to a third node. In such embodiments, the accuracy of the point measurements may decrease as compared to the other configurations. However, such embodiments allow for average measurements to be quickly obtained over large lengths of the pipe.

Additional Exemplary Sensing Applications

In some embodiments, the non-intrusive parameter detection techniques described herein may be used to measure or detect a volume fraction of water, oil, and/or gas within the pipe/vessel. In other words, the techniques described herein may be used to determine an amount of water versus an amount of oil and gas, an amount of oil versus an amount of gas and water, or an amount of gas versus the total amount of liquid (i.e., water and oil) within the pipe.

Furthermore, in some embodiments, the non-intrusive parameter detection techniques described herein may be used to identify the solids (e.g., the wax/scale and/or sand) that is deposited within the pipe. In other words, the techniques described herein may be used to accurately determine the composition of the solids within the pipe. This may be particularly useful for identifying asphaltenes, sand, hydrates, and the like, which will likely appear in the flowing phase before becoming deposited within the pipe.

Exemplary Signal Processing Methods for Analyzing Guided Acoustic Wave Modes Described Herein According to embodiments described herein, the acoustic transducers are clamped, glued, or otherwise attached in a permanent, semi-permanent, or temporary manner to the outside of a pipe or vessel. Because the transducers are non-intrusive with respect to the interior of the pipe, the transducers can form part of a sensor system that is distributed along a pipe. The resulting measurements are then sent to one or more computing system(s) via wired or wireless communication methods. The computing system(s) then use one or more suitable signal processing methods to characterize various parameters relating to the pipe. In this manner, the parameters relating to the pipe can be continuously monitored, thus allowing for early intervention efforts when negative conditions develop. An exemplary embodiment of a cluster computing system that may be used to implement the signal processing methods described herein is described with respect to FIG. 14.

In various embodiments, the guided acoustic wave modes can be analyzed using signal processing methods that are based on the phase velocity or the amplitude, or some combination of the phase velocity and the amplitude, for each mode. In particular, because the circumferential shear horizontal (C-SH) acoustic wave mode (i.e. Mode 1) propagates within the wall of the pipe and does not interact with the fluid inside the pipe, Mode 1 is not affected by the fluids flowing inside the pipe. In contrast, the circumferential Lamb type (C-LT) acoustic wave mode (i.e., Mode 2) propagates within the near-surface region of the pipe and, thus, interacts with the fluid inside the pipe; and the cavity (CA) acoustic wave mode (i.e., Mode 3) propagates directly through the fluid inside the pipe and, thus, clearly interacts with such fluid. As a result of the interaction of Mode 2 and Mode 3 with the fluids inside the pipe, the amplitudes and phase velocities of Mode 2 and Mode 3 are directly related to the acoustic properties of the fluid. Therefore, the amplitudes and phase velocities of Mode 2 and Mode 3 can be used for the sensing applications described herein. In other words, any suitable type(s) of signal processing method(s) can be used to characterize specific parameters (and/or detect changing conditions) relating to the pipe based on the direct comparison of the amplitudes and/or the phase velocities for the detected guided acoustic wave modes.

For example, in various embodiments, an amplitude-based signal processing method may be used. In such embodiments, the amplitude (or acoustic intensity) of Mode 2 and/or Mode 3 may be continuously monitored at fixed time intervals, and the amplitude may be correlated to one or more parameters of interest relating to the pipe. Moreover, since amplitude-based measurements are negatively affected by the degradation of the acoustic coupling between the transducer(s) and the pipe, the amplitude of Mode 1 can be used to calibrate the measurements.

As another example, in various embodiments, a phase-velocity-based signal processing method may be used. In such embodiments, the time-of-flight of Mode 3 may be calculated and used to characterize one or more parameters relating to the pipe. There are multiple methods for accurately measuring the time-of-flight of Mode 3. For example, a simple method is to detect the time delay based on the waveform peaks or dips. The sending waveform has multiple cycles at a known frequency, such as five peaks/dips (five cycles) at 200 kHz, and the receiving modes should have five peaks/dips (five cycles) at 200 kHz. Therefore, the time delays between sending and receiving peaks/dips should be the same for a fixed number of loops in the received mode. Thus, the five time delays measured at the five peaks/dips can be averaged for a time-of-flight estimation. Another method for measuring the time-of-flight of a wave seeks to take advantage of the full sending and receiving waveforms using an autocorrelation method. Two sections of the waveform, one from sending and the other from receiving, are selected, and the time delay is computed through autocorrelation between these two waveforms. The waveform peaks/dips detection method and the autocorrelation method have different computational requirements in terms of hardware design and implementation. Still other methods of accurately measuring the time-of-flight may include analyzing the wave shape (e.g., the amplitude, phase, and duration) of each mode as a whole and correlating this information to one or more parameters of interest. The correlation method may be based on statistical methods, where the shapes and separations in time of each mode are used for the measurements. Similar to optical FTIR (Fourier-transform infrared spectroscopy) technology, where the peak of each optical absorption signal represents a unique molecular characteristic in the system, guided acoustic spectroscopy may be used, where each mode represents a unique interaction of the guided acoustic wave with different environmental conditions or parameters. Statistical analytical tools used for FTIR signal processing (such as statistical analytical tools utilizing the chemometrics method and/or the principle component analysis method) may also be extended to process the guided acoustic wave modes described herein.

Exemplary Environments for Implementing Non-Intrusive Parameter Detection Techniques Described Herein The non-intrusive parameter detection techniques described herein may be used for a variety of applications in a variety of technical fields. In particular, the techniques described herein can be used to monitor parameters or conditions relating to any type of pipe or vessel through which the guided acoustic wave modes described herein can effectively propagate. In addition, such pipes and vessels can be implemented in surface or subsurface environments. For example, the techniques described herein have many beneficial applications in the oil and gas field, such as measuring parameters relating to pipes and vessels within hydrocarbon processing facilities and/or measuring parameters relating to tubulars and other downhole components within hydrocarbon wells. Two specific examples of the manner in which the techniques described herein can be utilized in the oil and gas field are described with respect to FIGS. 12 and 13.

Figure 12:
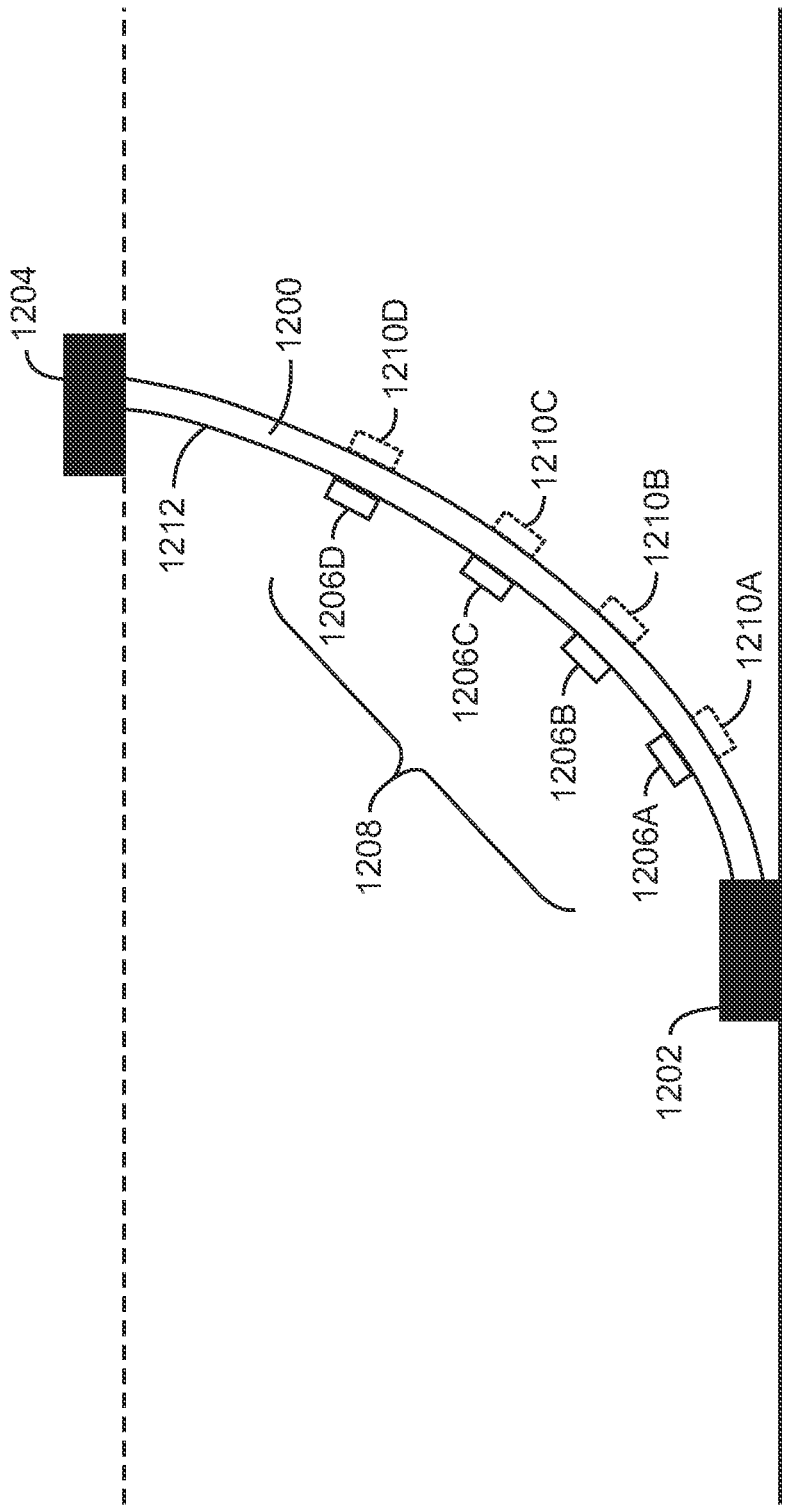
FIG. 12 is a side elevation view of a subsea riser for which the non-intrusive parameter detection techniques described herein may be implemented.

FIG. 12 is a side elevation view of a subsea riser 1200 for which the non-intrusive parameter detection techniques described herein may be implemented. This exemplary embodiment shows the manner in which the techniques described herein can be used for offshore hydrocarbon operations. As shown in FIG. 12, the riser 1200 is a fluid conduit (e.g., a pipe) that transfers hydrocarbon fluids between a subsea location 1202, such as one or more hydrocarbon wells, and a surface location 1204, such as a floating production facility.

In various embodiments, any number of acoustic transducers, such as acoustic transducers 1206A-D are installed along some length 1208 of the riser 1200 and are used to non-intrusively measure any of various parameters or conditions relating to the riser 1200. In some embodiments, the acoustic transducers 1206A-D are single transducers configured for pulse-echo mode operations, in which each transducer both transmits and receives the acoustic signals. In other embodiments, the acoustic transducers 1206A-D are single transducers that are configured for pitch-catch mode operation with acoustic transducers at neighboring nodes (e.g., the acoustic transducer 1206A at the first node transmits acoustic signals that are received by the acoustic transducer 1206B at the second node, and so on). In other embodiments, each acoustic transducer 1206A-D is paired with a corresponding acoustic transducer 1210A-D on an opposite side of the riser 1200, as indicated by the dotted lines in FIG. 12. In such embodiments, each transducer pair 1206A and 1210A, 1206B and 1210B, 1206C and 1210C, and 1206D and 1210D, respectively, is configured for pitch-catch mode operations, in which one transducer transmits the acoustic signals and the other transducer receives the acoustic signals. Moreover, in some embodiments, the acoustic transducers 1206A-D and 1210A-D are installed during manufacture of the riser 1200, while, in other embodiments, the acoustic transducers 1206A-D and 1210A-D are retrofitted for installation on existing risers 1200 using, for example, a remotely-operated marine vehicle.

Typical risers have some flexibility such that they have a generally horizontal axial orientation at the subsea location 1202 and a generally vertical axial orientation at the surface location 1204. Due to this gradual change in orientation, as well as the harsh and continuously-changing environmental conditions experienced at subsea locations, the flow parameters and conditions inside the riser 1200 can have a significant impact on the rate at which hydrocarbon fluids can be pumped from the subsea location 1202 to the surface location 1204. Therefore, in various embodiments, the non-intrusive parameter detection techniques described herein are used to measure any of various parameters relating to the riser 1200, such as the amount of solids deposition, the identification of solids, the multiphase flow conditions, the flow rate, the water/oil/gas volume fractions, and and/or the pressure inside the riser 1200, using the acoustic transducers 1206A-D (and 1210A-D). Moreover, due to the non-intrusive installment locations of the acoustic transducers 1206A-D (and 1210A-D) along the outer surface 1212 of the riser 1200, these measurements can be obtained without compromising the integrity of the riser 1200.

The side elevation view of FIG. 12 is not intended to indicate that the riser 1200 is limited to the configuration or the components shown in FIG. 12. Rather, the riser 1200 may include any number of additional components or alternative configurations. In particular, while only four nodes of transducers are shown in FIG. 12, it will be appreciated by one of skill in the art that the riser 1200 may include any number of nodes attached to any suitable length(s) of the riser 1200. For example, the riser 1200 may include 5-20 nodes, with a distance of about 0.2 to 20 meters between each node. As another example, the riser 1200 may include separate clusters of nodes located at particular sections of the riser 1200 (e.g., 5-10 nodes at one section and 5-10 nodes at another section, with a spacing of several hundred meters between each section).

Figure 13:
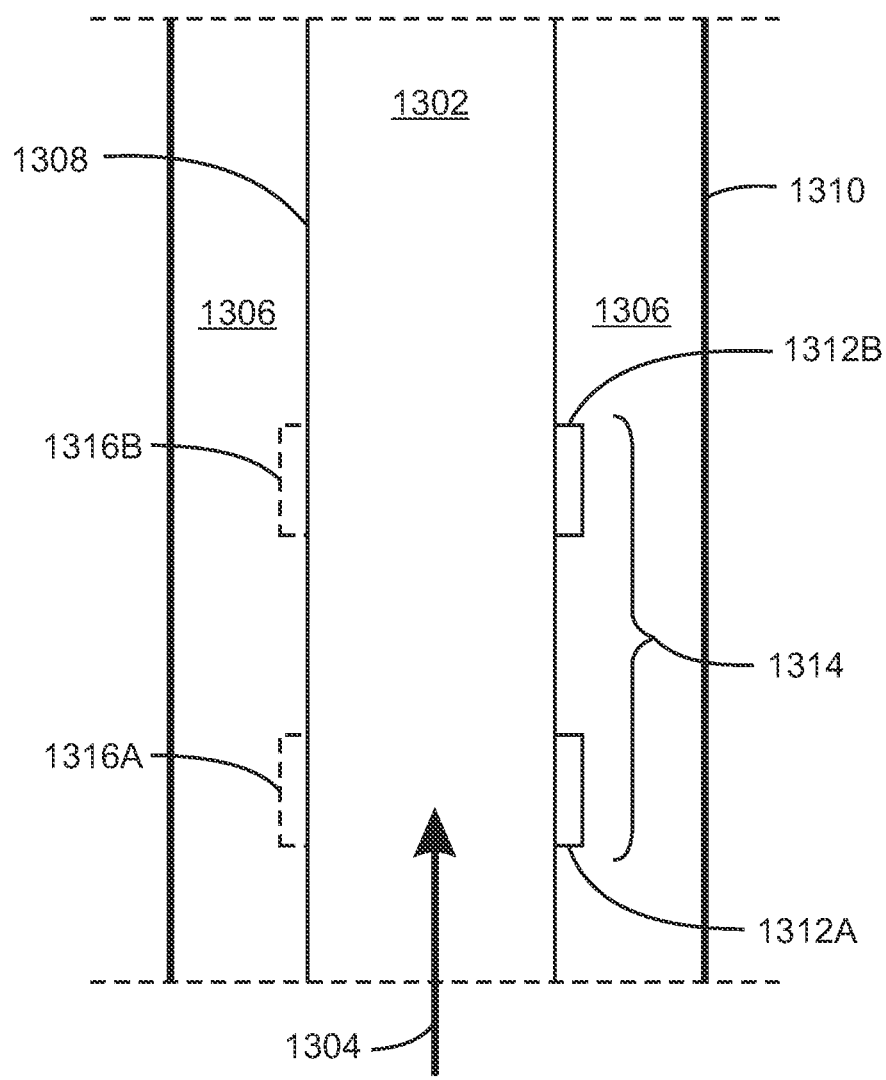
FIG. 13 is a side elevation view of a portion of a hydrocarbon well including a production tubing for which the non-intrusive parameter detection techniques described herein may be implemented.

FIG. 13 is a side elevation view of a portion of a hydrocarbon well 1300 including a production tubing 1302 for which the non-intrusive parameter detection techniques described herein may be implemented. The production tubing 1302 is a pipe or fluid conduit through which production fluids flow in the direction indicated by arrow 1304. Other fluids, such as gas or liquids, may also be present in an annulus 1306 between the outer wall 1308 of the production tubing 1302 and a surrounding casing 1310.

In various embodiments, any number of acoustic transducers, such as acoustic transducers 1312A and 1312B, are installed along some length 1314 of the outer wall 1308 of the production tubing 1302 and are used to non-intrusively measure any of various parameters or conditions relating to the production tubing 1302. In some embodiments, the acoustic transducers 1312A and 1312B are single transducers configured for pulse-echo mode operations, in which each transducer both transmits and receives the acoustic signals. In other embodiments, the acoustic transducers 1312A and 1312B are single transducers that are configured for pitch-catch mode operation with acoustic transducers at neighboring nodes (e.g., the acoustic transducer 1312A at the first node transmits acoustic signals that are received by the acoustic transducer 1312B at the second node). In other embodiments, each acoustic transducer 1312A and 1312B is paired with a corresponding acoustic transducer 1316A and 1316B on an opposite side of the production tubing 1302, as indicated by the dotted lines in FIG. 13. In such embodiments, each transducer pair 1312A and 1316A, and 1312B and 1316B, respectively, is configured for pitch-catch mode operations, in which one transducer transmits the acoustic signals and the other transducer receives the acoustic signals.

When the hydrocarbon well 1300 is in production, the production fluids flowing through the production tubing 1302 may have a significantly higher temperature than the other fluids flowing through the annulus 1306. This can cause the production fluids to experience gaseous expansion and phase changes, which may, in turn, significantly affect the flow rate of the production fluids. In addition, the properties of the production fluids flowing through the production tubing 1302 may naturally vary as production continues. Therefore, in various embodiments, the non-intrusive parameter detection techniques described herein are used to measure any of various parameters relating to the production tubing 1302, such as the amount of solids deposition, the identification of solids the multiphase flow conditions, the flow rate, the water/oil/gas volume fractions, and and/or the pressure inside the production tubing 1302, using the acoustic transducers 1312A, 1312B, 1316A, and 1316B. Moreover, due to the non-intrusive installment locations of the acoustic transducers 1312A, 1312B, 1316A, and 1316B along the outer wall 1308 of the production tubing 1302, these measurements can be obtained without compromising the integrity of the production tubing 1302.

The side elevation view of FIG. 13 is not intended to indicate that the hydrocarbon well 1300 is limited to the configuration or the components shown in FIG. 13. Rather, the hydrocarbon well 1300 may include any number of additional components or alternative configurations. In particular, while only two nodes of transducers are shown in FIG. 13, it will be appreciated by one of skill in the art that the production tubing 1302 may include any number of nodes attached to any suitable length(s) of the production tubing 1302. For example, the production tubing 1302 may include 5-20 nodes, with a distance of about 0.2 to 20 meters between each node. As another example, the production tubing 1302 may include separate clusters of nodes located at particular sections of the production tubing 1302.

Figure 14:
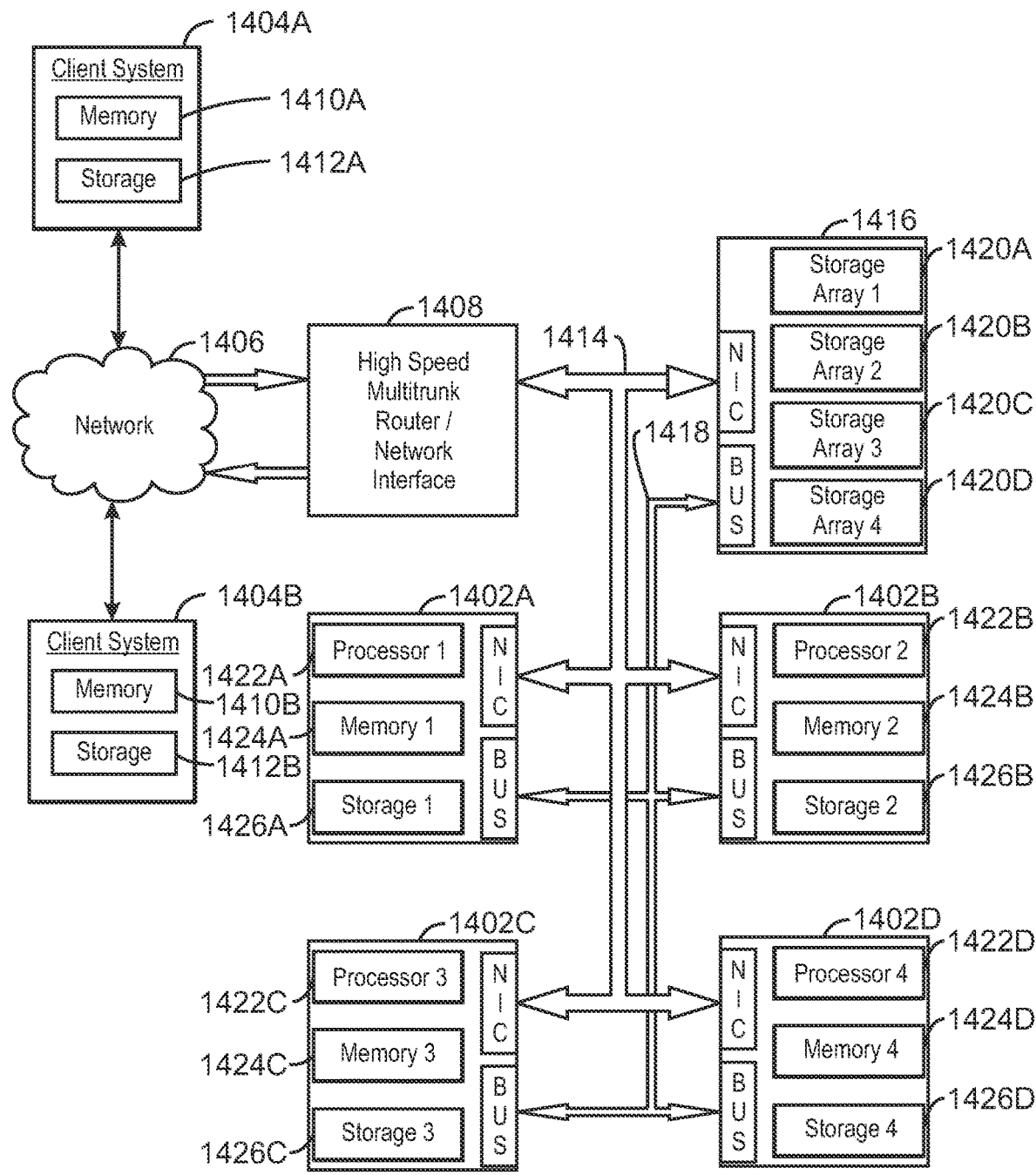
FIG. 14 is a block diagram of an exemplary cluster computing system that may be used to implement the non-intrusive parameter detection techniques described herein using data received from one or more acoustic transducers.

Exemplary Cluster Computing System for Implementing Non-Intrusive Parameter Detection Techniques Described Herein FIG. 14 is a block diagram of an exemplary cluster computing system 1400 that may be used to implement the non-intrusive parameter detection techniques described herein using data received from one or more acoustic transducers. The exemplary cluster computing system 1400 shown in FIG. 14 has four computing units 1402A, 1402B, 1402C, and 1402D, each of which may perform calculations for a portion of the non-intrusive parameter detection techniques described herein. However, one of ordinary skill in the art will recognize that the cluster computing system 1400 is not limited to this configuration, as any number of computing configurations may be selected. For example, a simple analysis may be run on a single computing unit, such as a workstation, while a more complicated calculation may be run on a cluster computing system 1400 having tens, hundreds, thousands, or even more computing units.

The cluster computing system 1400 may be accessed from any number of client systems 1404A and 1404B over a network 1406, for example, through a high-speed network interface 1408. The computing units 1402A to 1402D may also function as client systems, providing both local computing support and access to the wider cluster computing system 1400.

The network 1406 may include a local area network (LAN), a wide area network (WAN), the Internet, or any combinations thereof. Each client system 1404A and 1404B may include one or more non-transitory, computer-readable storage media for storing the operating code and program instructions that are used to implement the non-intrusive parameter detection techniques described herein. For example, each client system 1404A and 1404B may include a memory device 1410A and 1410B, which may include random access memory (RAM), read only memory (ROM), and the like. Each client system 1404A and 1404B may also include a storage device 1412A and 1412B, which may include any number of hard drives, optical drives, flash drives, or the like.

The high-speed network interface 1408 may be coupled to one or more buses in the cluster computing system 1400, such as a communications bus 1414. The communication bus 1414 may be used to communicate instructions and data from the high-speed network interface 1408 to a cluster storage system 1416 and to each of the computing units 1402A to 1402D in the cluster computing system 1400. The communications bus 1414 may also be used for communications among the computing units 1402A to 1402D and the cluster storage system 1416. In addition to the communications bus 1414, a high-speed bus 1418 can be present to increase the communications rate between the computing units 1402A to 1402D and/or the cluster storage system 1416.

The cluster storage system 1416 can have one or more non-transitory, computer-readable storage media, such as storage arrays 1420A, 1420B, 1420C and 1420D for the storage of models, data, visual representations, results, code, or other information, for example, concerning the implementation of and results from the non-intrusive parameter detection techniques described herein. The storage arrays 1420A to 1420D may include any combinations of hard drives, optical drives, flash drives, or the like.

Each computing unit 1402A to 1402D can have a processor 1422A, 1422B, 1422C and 1422D and associated local non-transitory, computer-readable storage media, such as a memory device 1424A, 1424B, 1424C and 1424D and a storage device 1426A, 1426B, 1426C and 1426D. Each processor 1422A to 1422D may be a multiple core unit, such as a multiple core central processing unit (CPU) or a graphics processing unit (GPU). Each memory device 1424A to 1424D may include ROM and/or RAM used to store program instructions for directing the corresponding processor 1422A to 1422D to implement the non-intrusive parameter detection techniques described herein. Each storage device 1426A to 1426D may include one or more hard drives, optical drives, flash drives, or the like. In addition, each storage device 1426A to 1426D may be used to provide storage for models, intermediate results, data, images, or code associated with operations, including code used to implement the non-intrusive parameter detection techniques described herein.

The present techniques are not limited to the architecture or unit configuration illustrated in FIG. 14. For example, any suitable processor-based device may be utilized for implementing all or a portion of embodiments of the non-intrusive parameter detection techniques described herein, including without limitation personal computers, laptop computers, computer workstations, mobile devices, and multi-processor servers or workstations with (or without) shared memory. Moreover, embodiments may be implemented on application specific integrated circuits (ASICs) or very-large-scale integrated (VLSI) circuits. In fact, persons of ordinary skill in the art may utilize any number of suitable structures capable of executing logical operations according to embodiments described herein.

Figure 15:
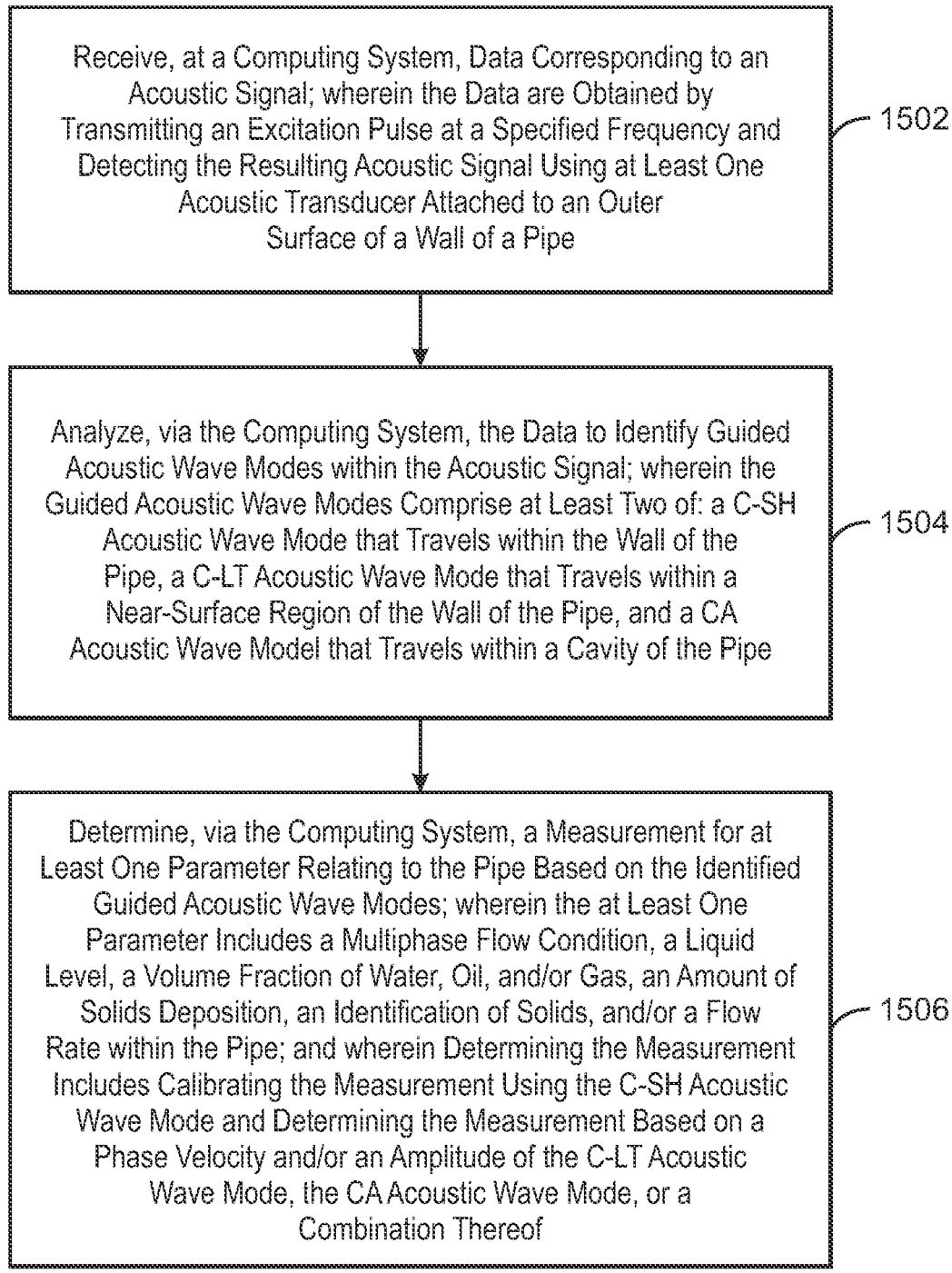
FIG. 15 is a process flow diagram of a method for measuring a parameter relating to a pipe using the guided acoustic wave modes described herein.

Exemplary Methods for Non-Intrusively Detecting Parameters Relating to Pipes/Vessels Using Guided Acoustic Wave Modes FIG. 15 is a process flow diagram of a method 1500 for measuring a parameter relating to a pipe using the guided acoustic wave modes described herein. In various embodiments, the method 1500 may be executed by any suitable type of computing system, such as the cluster computing system 1400 of FIG. 14. The method 1500 begins at block 1502, at which the computing system receives data corresponding to an acoustic signal, wherein the data are obtained by transmitting an excitation pulse at a specified frequency and detecting the resulting acoustic signal using at least one acoustic transducer attached to an outer surface of a wall of a pipe. In various embodiments, the specified frequency is within a range of 50 kHz to 1 MHz, or within a range of 10 kHz to 2 MHz.

In some embodiments, the at least one acoustic transducer includes a single acoustic transducer that is attached to the outer surface of the wall of the pipe in a direction that is perpendicular to the flow within the pipe, and the single acoustic transducer is configured for pulse-echo mode operation. In other embodiments, the at least one acoustic transducer includes a first acoustic transducer attached to the outer surface of the wall of the pipe in a direction that is perpendicular to the flow within the pipe and a second acoustic transducer that is attached to the outer surface of the wall of the pipe opposite to the first acoustic transducer and in the direction that is perpendicular to the flow within the pipe, and the first acoustic transducer and the second acoustic transducer are configured for pitch-catch mode operation.

At block 1504, the data are analyzed to identify guided acoustic wave modes within the acoustic signal. The guided acoustic wave modes include at least two modes: a circumferential shear horizontal (C-SH) acoustic wave mode that travels within the wall of the pipe, a circumferential Lamb type (C-LT) acoustic wave mode that travels within a near-surface region of the wall of the pipe, and/or a cavity (CA) acoustic wave mode that travels within a cavity of the pipe.

At block 1506, a measurement is determined for at least one parameter relating to the pipe based on the identified guided acoustic wave modes. The at least one parameter includes a multiphase flow condition, a liquid level, a volume fraction of water, oil, and/or gas, an amount of solids deposition, an identification of solids and/or a flow rate within the pipe. Moreover, determining the measurement includes calibrating the measurement using the C-SH acoustic wave mode and determining the measurement based on the phase velocity and/or the amplitude of the C-LT acoustic wave mode, the CA acoustic wave mode, or a combination thereof. For example, in some embodiments, a measurement is determined for the multiphase flow condition within the pipe by determining a volume fraction of a gas within a liquid flowing through the pipe based on the phase velocity and/or the amplitude of the CA acoustic wave mode. As another example, in some embodiments, a measurement is determined for the liquid level by: (1) determining a liquid level with the pipe based on the phase velocity and/or the amplitude of the C-LT acoustic wave mode; and/or (2) determining a gas pocket distribution within the pipe based on the phase velocity and/or the amplitude of the CA acoustic wave mode. As another example, in some embodiments, a measurement is determined for the amount of wax/scale deposition within a liquid-filled pipe by determining an amount of wax/scale that is deposited on the inner surface of the wall of the pipe based on the phase velocity and/or the amplitude of the C-LT acoustic wave mode, the CA acoustic wave mode, or a combination thereof. As another example, in some embodiments, a measurement is determined for the amount of wax/scale deposition within a gas-filled pipe by determining an amount of wax/scale that is deposited on an inner surface of the wall of the pipe based on the phase velocity and/or the amplitude of the C-LT acoustic wave mode. As another example, in some embodiments, a measurement is determined for the amount of sand deposition within the pipe by determining an amount of sand present within the pipe based on the phase velocity and/or the amplitude of the C-LT acoustic wave mode, the CA acoustic wave mode, or a combination thereof.

As another example, in some embodiments, a measurement is determined for the flow rate within the pipe by performing the following: (1) receiving data corresponding to acoustic signals obtained from acoustic transducers positioned at corresponding nodes along a length of the pipe, wherein each node includes at least one acoustic transducer for transmitting excitation pulses and detecting acoustic signals; (2) analyzing the data to identify the guided acoustic wave modes within the acoustic signals; and (3) determining the measurement for the flow rate by analyzing the data corresponding to the phase velocity of the CA acoustic wave mode within each node to detect a pattern of flow for each node, and calculating a change in the flow rate within the pipe based on a combination of known separation distances between each node and the calculated pattern of flow for each node. In some embodiments, the change in the flow rate is provided as a two-dimensional tomographic image of the flow profile within the pipe. This method for flow rate detection may be especially useful when the pipe includes turbulent flow conditions and/or non-homogenous, complex mixtures, such as, for example, one or more slugs, flowing through the pipe.

As yet another example, in some embodiments, a measurement is determined for the flow rate within the pipe by performing the following: (1) receiving data corresponding to acoustic signals obtained from acoustic transducers positioned at corresponding nodes along a length of the pipe, wherein each node includes at least one acoustic transducer for transmitting an excitation pulse and detecting a corresponding acoustic signal; (2) analyzing the data to identify the phase velocity of the guided acoustic wave modes within the acoustic signal at each node; (3) determining the measurement for the flow rate based on the phase velocities of the CA acoustic wave modes within the acoustic signals by cross-correlating data corresponding to the phase velocities of the CA acoustic wave modes at neighboring nodes to identify a correlation between the phase velocities and to calculate a propagation time for the correlated phase velocities between the neighboring nodes, and calculating the flow rate within the pipe based on a combination of known separation distances between the neighboring nodes and the calculated propagation time for the correlated phase velocities. Moreover, for embodiments in which each node includes multiple pairs of acoustic transducers (i.e., multiple transmitter-and-receiver arrays), the phase velocity for each node includes a two-dimensional tomographic phase velocity pattern of the CA acoustic wave mode, which is a surrogate of the composition of the flow profile at the location where the node is installed. Thus, to measure the flow rate, the phase velocities (or phase velocity patterns) of the CA acoustic wave modes at the different node locations are cross-correlated, and the cross correlation is then used, along with the known separation distances and the propagation time, to infer the flow rate between the two nodes along the pipe. In this manner, the flow rate profile can be built by determining the flow rate between neighboring nodes along the length of the pipe.

In various embodiments, the specified frequency at which the at least one acoustic transducer is to transmit the excitation pulse is determined based on the known properties of the pipe through which the acoustic signal propagates. This may be accomplished by: (1) receiving data corresponding to a circumferential guided acoustic wave mode propagating through the wall of the pipe; (2) analyzing the data to calculate a dispersion curve for the circumferential guided acoustic wave mode; (3) identifying one or more guided acoustic wave modes of interest; (4) selecting an excitation frequency range to experimentally determine the specified frequency at which to transmit the one or more guided acoustic wave modes of interest; (5) receiving experimental data corresponding to a series of excitation pulses generated within the pipe at regular frequency increments; (6) determining one or more frequencies of interest based on the experimental data; and (7) selecting the specified frequency at which the at least one acoustic transducer is to transmit the excitation pulse for the pipe with the known properties.

In various embodiments, the measurement for the at least one parameter is determined using at least one phase-velocity-based signal processing method or at least one amplitude-based signal processing method, or a combination thereof. In addition, in various embodiments, the C-SH acoustic wave mode is sensitive to the pressure within the wall of the pipe; and calibrating the measurement using the C-SH acoustic wave mode includes at least one of: (1) compensating for pressure fluctuations within the pipe by measuring a time-of-flight of the C-SH acoustic wave mode; (2) compensating for variations in transducer installation by monitoring an amplitude of the C-SH acoustic wave mode; or (3) compensating for a gradual degradation in a coupling between the at least one acoustic transducer and the wall of the pipe by monitoring the amplitude of the C-SH acoustic wave mode.

The process flow diagram of FIG. 15 is not intended to indicate that the steps of the method 1500 are to be executed in any particular order, or that all of the steps of the method 1500 are to be included in every case. Further, any number of additional steps not shown in FIG. 15 may be included within the method 1500, depending on the details of the specific implementation.

Advantages of Non-Intrusive Parameter Detection Techniques Described Herein

An advantage of the non-intrusive parameter detection techniques described herein is the simplicity of installation for the acoustic transducer(s). In some embodiments described herein, only one transducer is clamped onto, adhered to, or otherwise attached to the outer surface of a pipe or vessel. In other embodiments described herein, only two transducers are so attached. Moreover, there is no need to penetrate the tubular or the transducer housing.

Another advantage is that, because the disclosed transducer(s) operate in a frequency band between 50 kHz and 1 MHz, or between 10 kHz to 2 MHz, the transducer(s) are immune to most ambient background noise, including liquid flow noises. This reduces the need for more complex signal processing algorithms and methods.

Another advantage is that, because the transducer(s) are installed around the outer diameter of the pipe and perpendicular to the flow within the pipe, the measurements taken by the transducer(s) are immune to the Doppler effects of the flow within the pipe, and the fluid inside the pipe is unaffected by the transducer(s). Moreover, because no changes (e.g., holes) are made in the pipe wall, there is no weakening of the mechanical strength of the pipe, and there is no increase in deleterious aspects, such as corrosion or fouling. Furthermore, because holes or openings in the pipe wall would interfere with the guided acoustic wave modes travelling within the wall, the disclosed transducer(s) (which require no such holes or openings) provide a more accurate reading or measurement than could be obtained otherwise.

Another advantage is that the transducer installation described herein allows for self-calibration of the transducer(s). More specifically, among the three guided acoustic wave modes, the amplitude of one mode (i.e., Mode 1) is not a function of the measurements, while the amplitudes of the other two modes (i.e., Mode 2 and Mode 3) are functions of the measurements. Therefore, the non-sensitive mode is used as a calibration signal to compensate for variations between the detected acoustic signals that are caused by the transducer installation, as well as variations between the detected acoustic signals that are caused by long-term degradation of the coupling between the transducer(s) and the pipe.

Another advantage is that the pressure inside the pipe can be measured simultaneously with the measurement of the other parameter(s), such as the liquid level, solids (e.g., wax/scale and/or sand) deposition, multiphase (e.g., liquid/gas) flow conditions, and/or flow rate within the pipe. Because the pressure measurements taken according to techniques described herein are based on the time of flight of a circumferential guided acoustic wave mode inside the pipe wall rather than the signal amplitude, the pressure measurements are immune to the formation, deposition, and/or retention of non-fluids, such as wax/scale, sand, hydrates, and perhaps even scaling, within the pipe. Therefore, such pressure measurement can be used as a pressure compensation function for the other measurement of the other parameter(s).

Yet another advantage is that, according to embodiments described herein, the excitation pulse is generated with a low frequency band. This allows for a prolonged signal path length due to the signal's low attenuation as compared to the attenuation of signals with higher frequency bands. As a result, the techniques described herein allow for high measurement sensitivity as compared to previous techniques.

Exemplary Embodiments of Present Techniques

In one or more embodiments, the present techniques may be susceptible to various modifications and alternative forms, such as the following embodiments as noted in paragraphs 1 to 15.

1. A method for measuring a parameter relating to a pipe using guided acoustic wave modes, comprising: receiving, at a computing system, data corresponding to an acoustic signal; wherein the data are obtained by transmitting an excitation pulse at a specified frequency and detecting the resulting acoustic signal using at least one acoustic transducer attached to an outer surface of a wall of a pipe; and wherein the specified frequency is within a range of 10 kilohertz (kHz) to 2 megahertz (MHz); analyzing, via the computing system, the data to identify guided acoustic wave modes within the acoustic signal; wherein the guided acoustic wave modes comprise at least two of: a circumferential shear horizontal (C-SH) acoustic wave mode that travels within the wall of the pipe; a circumferential Lamb type (C-LT) acoustic wave mode that travels within a near-surface region of the wall of the pipe; or a cavity (CA) acoustic wave mode that travels within a cavity of the pipe; and determining, via the computing system, a measurement for at least one parameter relating to the pipe based on the identified guided acoustic wave modes; wherein the at least one parameter comprises at least one of a multiphase flow condition, a liquid level, a volume fraction of water, oil, and/or gas, an amount of solids deposition, an identification of solids, or a flow rate within the pipe; and wherein determining the measurement comprises: calibrating the measurement using the C-SH acoustic wave mode; and determining the measurement based on a phase velocity and/or an amplitude of the C-LT acoustic wave mode, the CA acoustic wave mode, or a combination thereof.

2. The method of paragraph 1, wherein the at least one parameter comprises the multiphase flow condition within the pipe; and wherein determining the measurement for the multiphase flow condition comprises determining a volume fraction of a gas within a liquid flowing through the pipe based on the phase velocity and/or the amplitude of the CA acoustic wave mode.

3. The method of paragraph 1 or 2, wherein the at least one parameter comprises the liquid level within the pipe; and wherein determining the measurement for the liquid level comprises at least one of: determining a liquid level with the pipe based on the phase velocity and/or the amplitude of the C-LT acoustic wave mode; or determining a gas pocket distribution within the pipe based on the phase velocity and/or the amplitude of the CA acoustic wave mode.

4. The method of any of paragraphs 1 to 3, wherein the at least one parameter comprises the amount of solids deposition within the pipe; wherein the solids comprise primarily wax/scale and the pipe is filled with liquid; and wherein determining the measurement for the amount of solids deposition comprises determining an amount of wax/scale that is deposited on an inner surface of the wall of the pipe based on the phase velocity and/or the amplitude of the C-LT acoustic wave mode, the CA acoustic wave mode, or a combination thereof.

5. The method of any of paragraphs 1 to 3, wherein the at least one parameter comprises the amount of solids deposition within the pipe; wherein the solids comprise primarily wax/scale and the pipe is filled with gas; and wherein determining the measurement for the amount of solids deposition comprises determining an amount of wax/scale that is deposited on an inner surface of the wall of the pipe based on the phase velocity and/or the amplitude of the C-LT acoustic wave mode.

6. The method of any of paragraphs 1 to 3, wherein the at least one parameter comprises the amount of solids deposition within the pipe; wherein the solids comprise primarily sand; and wherein determining the measurement for the amount of solids deposition comprises determining an amount of sand present within the pipe based on the phase velocity and/or the amplitude of the C-LT acoustic wave mode, the CA acoustic wave mode, or a combination thereof.

7. The method of any of paragraphs 1 to 6, wherein the at least one parameter comprises the flow rate within the pipe; and wherein the method comprises: receiving, at the computing system, data corresponding to acoustic signals obtained from acoustic transducers positioned at corresponding nodes along a length of the pipe, wherein each node comprises at least one acoustic transducer for transmitting excitation pulses and detecting acoustic signals; analyzing, via the computing system, the data to identify the guided acoustic wave modes within the acoustic signals; and determining, via the computing system, the measurement for the flow rate by: analyzing the data corresponding to the phase velocity of the CA acoustic wave mode within each node to detect a pattern of flow for each node; and calculating a change in the flow rate within the pipe based on a combination of known separation distances between each node and the calculated pattern of flow for each node.

8. The method of any of paragraphs 1 to 6, wherein the at least one parameter comprises the flow rate within the pipe; and wherein the method comprises: receiving, at the computing system, data corresponding to acoustic signals obtained from acoustic transducers positioned at corresponding nodes along a length of the pipe, wherein each node comprises at least one acoustic transducer for transmitting an excitation pulse and detecting a corresponding acoustic signal; analyzing, via the computing system, the data to identify a phase velocity of guided acoustic wave modes within the acoustic signal at each node; and determining, via the computing system, the measurement for the flow rate based on the phase velocities of the CA acoustic wave modes within the acoustic signals by: cross-correlating data corresponding to the phase velocities of the CA acoustic wave modes at neighboring nodes to identify a correlation between the phase velocities and to calculate a propagation time for the correlated phase velocities between the neighboring nodes; and calculating the flow rate within the pipe based on a combination of known separation distances between the neighboring nodes and the calculated propagation time for the correlated phase velocities.

9. The method of any of paragraphs 1 to 8, comprising determining, at the computing system, the specified frequency at which the at least one acoustic transducer is to transmit the excitation pulse based on known properties of the pipe through which the acoustic signal propagates by: receiving data corresponding to a circumferential guided acoustic wave mode propagating through the wall of the pipe; analyzing the data to calculate a dispersion curve for the circumferential guided acoustic wave mode; identifying one or more guided acoustic wave modes of interest; selecting an excitation frequency range to experimentally determine the specified frequency at which to transmit the one or more guided acoustic wave modes of interest; receiving experimental data corresponding to a series of excitation pulses generated within the pipe at regular frequency increments; determining one or more frequencies of interest based on the experimental data; and selecting the specified frequency at which the at least one acoustic transducer is to transmit the excitation pulse for the pipe with the known properties.

10. The method of any of paragraphs 1 to 9, comprising determining, at the computing system, the measurement for the at least one parameter using at least one phase-velocity-based signal processing method or at least one amplitude-based signal processing method, or a combination thereof.

11. The method of any of paragraphs 1 to 10, wherein the C-SH acoustic wave mode is sensitive to a pressure within the wall of the pipe; and wherein calibrating the measurement using the C-SH acoustic wave mode comprises at least one of: compensating for pressure fluctuations within the pipe by measuring a time-of-flight of the C-SH acoustic wave mode; compensating for variations in transducer installation by monitoring an amplitude of the C-SH acoustic wave mode; or compensating for a gradual degradation in a coupling between the at least one acoustic transducer and the wall of the pipe by monitoring the amplitude of the C-SH acoustic wave mode.

12. A system, comprising an acoustic transducer attached to an outer surface of a wall of a pipe in a direction that is perpendicular to a flow within the pipe; wherein the acoustic transducer is configured for a pulse-echo mode operation in which the acoustic transducer transmits an excitation pulse at a specified frequency that is within a range of 10 kilohertz (kHz) to 2 megahertz (MHz) and detects the resulting acoustic signal; and wherein the acoustic signal comprises guided acoustic wave modes that comprise at least two of: a circumferential shear horizontal (C-SH) acoustic wave mode that travels within the wall of the pipe; a circumferential Lamb type (C-LT) acoustic wave mode that travels within a near-surface region of the wall of the pipe; and a cavity (CA) acoustic wave mode that travels within a cavity of the pipe; wherein properties of the C-LT acoustic wave mode and/or the CA acoustic wave mode are directly correlated to at least one of a multiphase flow condition, a liquid level, a volume fraction of water, oil, and/or gas, an amount of solids deposition, an identification of solids, or a flow rate within the pipe; and wherein properties of the C-SH acoustic wave mode are directly correlated to a pressure within the pipe but are substantially immune to the multiphase flow condition, the liquid level, the volume fraction of water, oil, and/or gas, the amount of solids deposition, the identification of solids, and the flow rate within the pipe.

13. The system of paragraph 12, wherein a phase velocity and an amplitude of the C-LT acoustic wave mode and/or the CA acoustic wave mode are directly correlated to the at least one of the multiphase flow condition, the liquid level, the volume fraction of water, oil, and/or gas, the amount of solids deposition, the identification of solids, or the flow rate within the pipe.

14. The system of paragraph 12 or 13, wherein the system comprises a computing system that is communicably coupled to the acoustic transducer via a wired or wireless connection, and wherein the computing system comprises: a processor; and a non-transitory, computer-readable storage medium, comprising code configured to direct the processor to determine a measurement for at least one of the multiphase flow condition, the liquid level, the volume fraction of water, oil, and/or gas, the amount of solids deposition, the identification of solids, or the flow rate based on the properties of the C-LT acoustic wave mode, the CA acoustic wave mode, or a combination thereof.

15. The system of paragraph 14, wherein the non-transitory, computer-readable storage medium further comprises code configured to direct the processor to calibrate the measurement using the C-SH acoustic wave mode.

Moreover, while the embodiments described herein are well-calculated to achieve the advantages set forth, it will be appreciated that such embodiments are susceptible to modification, variation, and change without departing from the spirit thereof. Indeed, the present techniques include all alternatives, modifications, and equivalents falling within the true spirit and scope of the appended claims.

What is claimed is:

1. A method for measuring a parameter relating to a pipe using guided acoustic wave modes, comprising:
receiving, at a computing system, data corresponding to an acoustic signal;
wherein the data are obtained by transmitting an excitation pulse at a specified frequency and detecting the resulting acoustic signal using at least one acoustic transducer attached to an outer surface of a wall of a pipe; and wherein the specified frequency is within a range of 10 kilohertz (kHz) to 2 megahertz (MHz);

analyzing, via the computing system, the data to identify guided acoustic wave modes within the acoustic signal; wherein the guided acoustic wave modes comprise a circumferential shear horizontal (C-SH) acoustic wave mode that travels within the wall of the pipe and at least one of:
  a circumferential Lamb type (C-LT) acoustic wave mode that travels within a near-surface region of the wall of the pipe; or
  a cavity (CA) acoustic wave mode that travels within a cavity of the pipe; and
determining, via the computing system, a measurement for at least one parameter relating to the pipe based on the identified guided acoustic wave modes; wherein the at least one parameter comprises at least one of a multiphase flow condition, a liquid level, a volume fraction of water, oil, and/or gas, an amount of solids deposition, an identification of solids, or a flow rate within the pipe; and wherein determining the measurement comprises: calibrating the measurement using the C-SH acoustic wave mode; and
  determining the measurement based on a phase velocity and/or an amplitude of the at least one of the C-LT acoustic wave mode or the CA acoustic wave mode.

2. The method of claim 1, wherein the at least one parameter comprises the multiphase flow condition within the pipe; and wherein determining the measurement for the multiphase flow condition comprises determining a volume fraction of a gas within a liquid flowing through the pipe based on the phase velocity and/or the amplitude of the CA acoustic wave mode.

3. The method of claim 1, wherein the at least one parameter comprises the liquid level within the pipe; and wherein determining the measurement for the liquid level comprises at least one of:
  determining a liquid level with the pipe based on the phase velocity and/or the amplitude of the C-LT acoustic wave mode; or
  determining a gas pocket distribution within the pipe based on the phase velocity and/or the amplitude of the CA acoustic wave mode.

4. The method of claim 1, wherein the at least one parameter comprises the amount of solids deposition within the pipe; wherein the solids comprise primarily wax/scale and the pipe is filled with liquid; and wherein determining the measurement for the amount of solids deposition comprises determining an amount of wax/scale that is deposited on an inner surface of the wall of the pipe based on the phase velocity and/or the amplitude of the at least one of the C-LT acoustic wave mode or the CA acoustic wave mode.

5. The method of claim 1, wherein the at least one parameter comprises the amount of solids deposition within the pipe; wherein the solids comprise primarily wax/scale and the pipe is filled with gas; and wherein determining the measurement for the amount of solids deposition comprises determining an amount of wax/scale that is deposited on an inner surface of the wall of the pipe based on the phase velocity and/or the amplitude of the C-LT acoustic wave mode.

6. The method of claim 1, wherein the at least one parameter comprises the amount of solids deposition within the pipe; wherein the solids comprise primarily sand; and wherein determining the measurement for the amount of solids deposition comprises determining an amount of sand present within the pipe based on the phase velocity and/or the amplitude of the at least one of the C-LT acoustic wave mode or the CA acoustic wave mode.

7. The method of claim 1, wherein the at least one parameter comprises the flow rate within the pipe; and wherein the method comprises:
  receiving, at the computing system, data corresponding to acoustic signals obtained from acoustic transducers positioned at corresponding nodes along a length of the pipe, wherein each node comprises at least one acoustic transducer for transmitting excitation pulses and detecting acoustic signals;
  analyzing, via the computing system, the data to identify the guided acoustic wave modes within the acoustic signals; and
  determining, via the computing system, the measurement for the flow rate by:
    analyzing the data corresponding to the phase velocity of the CA acoustic wave mode within each node to detect a pattern of flow for each node; and
    calculating a change in the flow rate within the pipe based on a combination of known separation distances between each node and the calculated pattern of flow for each node.

8. The method of claim 1, wherein the at least one parameter comprises the flow rate within the pipe; and wherein the method comprises:
  receiving, at the computing system, data corresponding to acoustic signals obtained from acoustic transducers positioned at corresponding nodes along a length of the pipe, wherein each node comprises at least one acoustic transducer for transmitting an excitation pulse and detecting a corresponding acoustic signal;
  analyzing, via the computing system, the data to identify a phase velocity of guided acoustic wave modes within the acoustic signal at each node; and
  determining, via the computing system, the measurement for the flow rate based on the phase velocities of the CA acoustic wave modes within the acoustic signals by:
    cross-correlating data corresponding to the phase velocities of the CA acoustic wave modes at neighboring nodes to identify a correlation between the phase velocities and to calculate a propagation time for the correlated phase velocities between the neighboring nodes; and
    calculating the flow rate within the pipe based on a combination of known separation distances between the neighboring nodes and the calculated propagation time for the correlated phase velocities.

9. The method of claim 1, comprising determining, at the computing system, the specified frequency at which the at least one acoustic transducer is to transmit the excitation pulse based on known properties of the pipe through which the acoustic signal propagates by:
  receiving data corresponding to a circumferential guided acoustic wave mode propagating through the wall of the pipe;
  analyzing the data to calculate a dispersion curve for the circumferential guided acoustic wave mode;
  identifying one or more guided acoustic wave modes of interest;
  selecting an excitation frequency range to experimentally determine the specified frequency at which to transmit the one or more guided acoustic wave modes of interest;
  receiving experimental data corresponding to a series of excitation pulses generated within the pipe at regular frequency increments;
  determining one or more frequencies of interest based on the experimental data; and selecting the specified frequency at which the at least one acoustic transducer is to transmit the excitation pulse for the pipe with the known properties.

10. The method of claim 1, comprising determining, at the computing system, the measurement for the at least one parameter using at least one phase-velocity-based signal processing method or at least one amplitude-based signal processing method, or a combination thereof.

11. The method of claim 1, wherein the C-SH acoustic wave mode is sensitive to a pressure within the wall of the pipe; and wherein calibrating the measurement using the C-SH acoustic wave mode comprises at least one of:
compensating for pressure fluctuations within the pipe by measuring a time-of-flight of the C-SH acoustic wave mode;
compensating for variations in transducer installation by monitoring an amplitude of the C-SH acoustic wave mode; or
compensating for a gradual degradation in a coupling between the at least one acoustic transducer and the wall of the pipe by monitoring the amplitude of the C-SH acoustic wave mode.

12. A system, comprising an acoustic transducer attached to an outer surface of a wall of a pipe in a direction that is perpendicular to a flow within the pipe;
wherein the acoustic transducer is configured for a pulse-echo mode operation in which the acoustic transducer transmits an excitation pulse at a specified frequency that is within a range of 10 kilohertz (kHz) to 2 megahertz (MHz) and detects the resulting acoustic signal; and
wherein the acoustic signal comprises guided acoustic wave modes that comprise a circumferential shear horizontal (C-SH) acoustic wave mode that travels within the wall of the pipe and at least one of:
a circumferential Lamb type (C-LT) acoustic wave mode that travels within a near-surface region of the wall of the pipe; or
a cavity (CA) acoustic wave mode that travels within a cavity of the pipe;
wherein properties of the at least one of the C-LT acoustic wave mode or the CA acoustic wave mode are directly correlated to at least one of a multiphase flow condition, a liquid level, a volume fraction of water, oil, and/or gas, an amount of solids deposition, an identification of solids, or a flow rate within the pipe; and
wherein properties of the C-SH acoustic wave mode are directly correlated to a pressure within the pipe but are substantially immune to the multiphase flow condition, the liquid level, the volume fraction of water, oil, and/or gas, the amount of solids deposition, an identification of solids, and the flow rate within the pipe.

13. The system of claim 12, comprising nodes of acoustic transducers positioned along a length of the pipe; wherein each node comprises a corresponding acoustic transducer attached to the outer wall of the pipe; and wherein the acoustic transducer of each node is configured for pitch-catch mode operations with the acoustic transducers of neighboring nodes.

14. The system of claim 12, wherein a phase velocity and an amplitude of the at least one of the C-LT acoustic wave mode or the CA acoustic wave mode are directly correlated to the at least one of the multiphase flow condition, the liquid level, the volume fraction of water, oil, and/or gas, the amount of solids deposition, the identification of solids, or the flow rate within the pipe.

15. The system of claim 12, wherein the system comprises a computing system that is communicably coupled to the acoustic transducer via a wired or wireless connection, and wherein the computing system comprises:
a processor; and
a non-transitory, computer-readable storage medium, comprising code configured to direct the processor to determine a measurement for at least one of the multiphase flow condition, the liquid level, the volume fraction of water, oil, and/or gas, the amount of solids deposition, the identification of solids, or the flow rate based on the properties of the at least one of the C-LT acoustic wave mode or the CA acoustic wave mode.

16. The system of claim 15, wherein the non-transitory, computer-readable storage medium further comprises code configured to direct the processor to determine the specified frequency at which the acoustic transducer is to transmit the excitation pulse based on known properties of the pipe.

17. The system of claim 15, wherein the non-transitory, computer-readable storage medium further comprises code configured to direct the processor to calibrate the measurement using the C-SH acoustic wave mode.

* * * * *